(12) United States Patent
Currie et al.

(10) Patent No.: US 7,910,043 B2
(45) Date of Patent: Mar. 22, 2011

(54) TIRE BUILDING AND CURE STATION COUPLING APPARATUS AND METHOD

(75) Inventors: William Dudley Currie, Stow, OH (US); Dennis Alan Lundell, Akron, OH (US); David Alan Henthorne, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 759 days.

(21) Appl. No.: 11/962,227

(22) Filed: Dec. 21, 2007

(65) Prior Publication Data

US 2009/0160098 A1 Jun. 25, 2009

(51) Int. Cl.
*B29C 35/02* (2006.01)
*B29D 30/12* (2006.01)

(52) U.S. Cl. ............... 264/326; 425/38; 425/41; 425/50

(58) Field of Classification Search .................. 425/38, 425/41, 50, 54, 55; 264/326; 156/414, 417, 156/421.6

See application file for complete search history.

(56) References Cited

U.S. PATENT DOCUMENTS

| | | | |
|---|---|---|---|
| 1,179,898 A | 4/1916 | Coffey et al. | |
| 1,388,255 A | 8/1921 | Hardeman | |
| 1,682,620 A | 8/1928 | Ledwinka | |
| 2,123,586 A | 7/1938 | Heston | 154/9 |
| 3,560,302 A | 2/1971 | Missioux | 156/515 |
| 3,607,558 A | 9/1971 | Nebout | 156/415 |
| 3,684,621 A | 8/1972 | Frazier et al. | 156/401 |
| 3,767,509 A | 10/1973 | Gazuit | 146/415 |

(Continued)

FOREIGN PATENT DOCUMENTS

DE 2002294 7/1971

(Continued)

OTHER PUBLICATIONS

European Search Report completed Mar. 10, 2009.

Primary Examiner — James Mackey
(74) Attorney, Agent, or Firm — Richard B. O'Planick

(57) ABSTRACT

A tire building and cure station coupling apparatus and method for molding a green tire into a finished tire having a tread pattern. The green tire is constructed on a toroidally shaped core formed by a plurality of core segments each having an outer surface portion which together define a toroidal outer surface surrounding a central axis. The core is adapted to hold a green tire on said toroidal outer surface. A first spindle section is configured to be placed on a first side of the core along the central axis and a second spindle section is configured to be placed on a second side of the core along the central axis and opposite to the first side. At least one electrically operated heating element is coupled with each said core segment and at least one spindle connector is configured to mechanically couple the first and second spindle sections with said plurality of core segments located therebetween and electrically connect with the electrically operated heating elements for supplying electrical power thereto during a tire curing operation. One or more curing line docking stations are provided, each having docking apparatus for mechanically coupling with a spindle end of a spindle sections for a docking time interval, the docking apparatus including a docking connector configured to mechanically and electrically couple with the spindle connector for supplying electrical power to the electrically operated heating elements for at least a portion of the docking time interval.

10 Claims, 30 Drawing Sheets

U.S. PATENT DOCUMENTS

| | | | | |
|---|---|---|---|---|
| 3,833,445 | A | 9/1974 | Mallory et al. | 156/401 |
| 3,868,203 | A | 2/1975 | Turk | 425/242 |
| 4,007,080 | A | 2/1977 | Klopper | 156/396 |
| 4,043,725 | A | 8/1977 | Schmidt | 425/542 |
| 4,045,277 | A | 8/1977 | Habert et al. | 156/417 |
| 4,083,672 | A | 4/1978 | Vaishnav | 425/457 |
| 4,211,592 | A | 7/1980 | Grawey | 156/123 |
| 4,728,274 | A | 3/1988 | Sigenthaler | 425/34 R |
| 4,877,468 | A | 10/1989 | Siegenthaler et al. | 156/111 |
| 4,895,692 | A | 1/1990 | Laurent et al. | 264/326 |
| 5,201,975 | A | 4/1993 | Holroyd et al. | 156/124 |
| 5,384,084 | A | 1/1995 | Siegenthaler | 264/237 |
| 5,622,669 | A | 4/1997 | Dailliez et al. | 264/403 |
| 5,853,526 | A | 12/1998 | Laurent et al. | 156/398 |
| 6,203,641 | B1 | 3/2001 | Laurent et al. | 156/110.1 |
| 6,234,227 | B1 | 5/2001 | Bosseaux | 156/398 |
| 6,250,356 | B1 | 6/2001 | Cordaillat et al. | 156/400 |
| 6,318,432 | B1 | 11/2001 | Caretta et al. | 152/552 |
| 6,406,575 | B1 | 6/2002 | Baumgarten et al. | 156/96 |
| 6,468,062 | B1 * | 10/2002 | Soulalioux et al. | 425/50 |
| 7,691,217 | B2 * | 4/2010 | Misani et al. | 425/41 |
| 2003/0157209 | A1 | 8/2003 | Scarzello et al. | 425/35 |

FOREIGN PATENT DOCUMENTS

| | | |
|---|---|---|
| EP | 0 468 342 A1 | 7/1991 |
| EP | 0 893 237 A2 | 1/1999 |
| EP | 0 928 679 A2 | 7/1999 |
| EP | 978370 | 2/2000 |
| EP | 1 090 729 | 4/2001 |
| GB | 167073 | 8/1921 |
| GB | 549905 | 12/1942 |
| GB | 1524369 | 9/1978 |
| JP | 11-291363 | 10/1999 |
| JP | 11-320567 | 11/1999 |
| JP | 2001-001342 | 1/2001 |
| JP | 2001-079850 | 3/2001 |
| JP | 2002-096403 | 4/2002 |
| WO | 82/00017 | 1/1982 |
| WO | 01/62481 | 5/2001 |
| WO | 01/62481 | 8/2001 |
| WO | 02/45942 A1 | 6/2002 |
| WO | 03/101711 | 12/2003 |
| WO | 03/103935 | 12/2003 |
| WO | 2004/045838 | 6/2004 |
| WO | 2005/009724 | 2/2005 |

\* cited by examiner

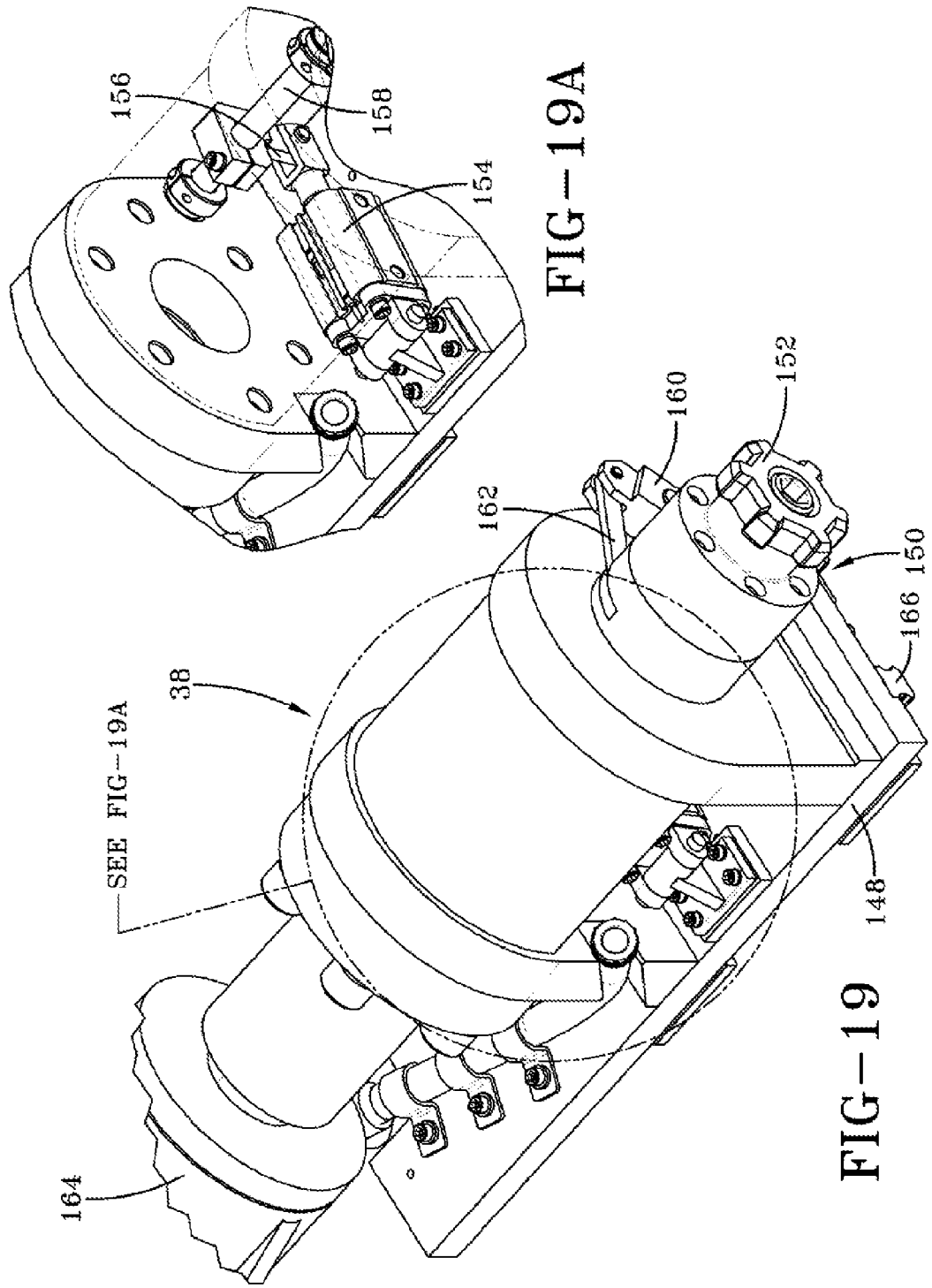

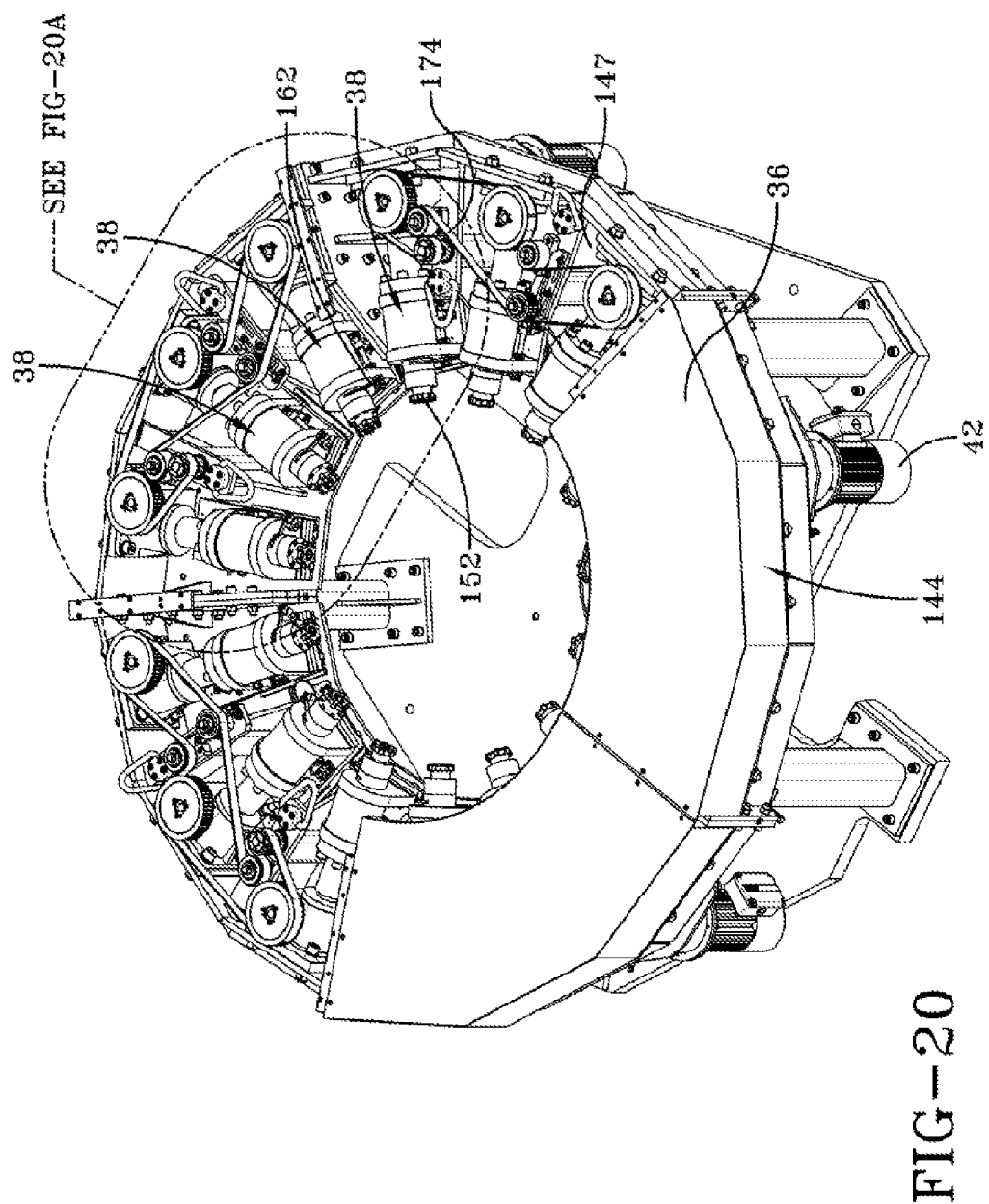

TIRE BUILDING AND CURE STATION COUPLING APPARATUS AND METHOD

FIELD OF THE INVENTION

The subject invention relates generally to automated tire manufacturing lines and more specifically to tire building and cure core coupling apparatus and method in an integrated tire manufacturing system.

BACKGROUND OF THE INVENTION

It is known to vulcanize uncured or green tires within a mold. Co-pending patent application U.S. Ser. No. 10/417,849 entitled "A METHOD FOR CURING TIRES AND A SELF-LOCKING TIRE MOLD" discloses a method for curing tires in a self-locking tire mold. It is a continuing desire to utilize such a mold within a tire manufacturing system in such a way so as to maximize efficiency and minimize cost in the production of a tire. It is further known to utilize the mold for curing a green tire pre-constructed on a tire building core assembly. It is likewise desirable to utilize a mold for curing a green tire pre-constructed on a tire building core assembly in an efficient and cost-effective manner.

SUMMARY OF THE INVENTION

According to one aspect of the invention, a curing line coupling apparatus for molding a green tire into a finished tire having a tread pattern includes a toroidally shaped core formed by a plurality of core segments each having an outer surface portion which together define a toroidal outer surface surrounding a central axis. The core is adapted to hold a green tire on the toroidal outer surface. A first spindle section is configured to be placed on a first side of the core along the central axis and a second spindle section is configured to be placed on a second side of the core along the central axis and opposite to the first side. At least one electrically operated heating element is coupled with each core segment and at least one spindle connector is configured to mechanically couple the first and second spindle sections with the plurality of core segments located therebetween and electrically connect with the electrically operated heating elements for supplying electrical power thereto during a tire curing operation. One or more curing line docking station(s) has docking apparatus coupling with a spindle end of a spindle section for a respective docking time interval(s), the docking apparatus operatively configured to mechanically and electrically couple with the spindle connector for supplying electrical power to the electrically operated heating elements for at least part of the docking time interval(s).

A further aspect of the invention is to a method of molding a green tire into a finished tire having a tread pattern, including assembling a plurality of core segments into a toroidal-shaped assembled core surrounding a central axis. Each core segment includes at least one electrically operated heating element, and the core segments together define a toroidal outer surface. The core is adapted to hold a green tire on said toroidal outer surface. The method includes placing a first spindle section on a first side of the plurality of the assembled core along the central axis; placing a second spindle section on a second side of the assembled core along the central axis and opposite to the first side; mechanically coupling the first and second spindle sections with the plurality of core segments so as to locate the plurality of core segments between the first and second spindle sections; connecting an electrical connector carried by at least one of the first or second spindle sections with the electrically operated heating elements for supplying electrical power thereto during a tire curing operation. The method further includes mechanically coupling a spindle end of at least one of said first and second spindle sections to docking apparatus in one or more curing line docking station(s) for a respective docking time interval(s). The docking apparatus includes at least one docking connector configured to mechanically and electrically couple with the at least one spindle connector for supplying electrical power to the electrically operated heating elements for at least a portion of the docking time interval(s).

BRIEF DESCRIPTION OF THE DRAWINGS

The invention will be described by way of example and with reference to the accompanying drawings in which:

FIG. 12 A is a bottom perspective view of the upper sub-assembly of the mold gripper assembly lowered onto the segmented mold.

FIG. 14 A is a bottom perspective view thereof.

FIG. 19 is a front partial perspective view of one tread segment manipulator device.

FIG. 19A is an enlarged perspective view of the tread segment manipulator device of FIG. 19 with an outer cover portion removed for the purpose of illustration.

FIG. 20 is a top perspective view of the tread segment manipulating sub-assembly with selective covers removed for the purpose of illustration.

DEFINITIONS

Figure 1:
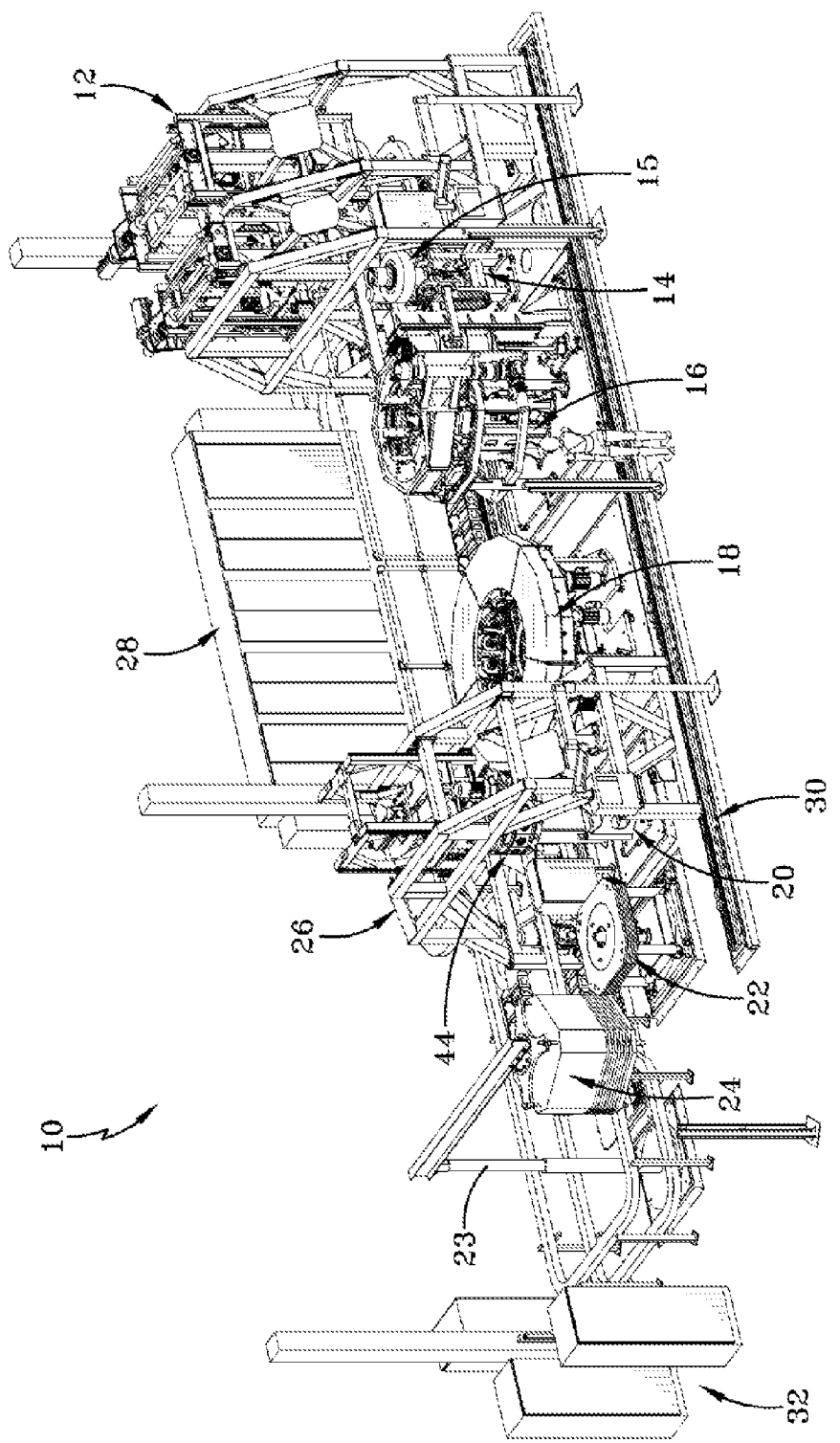
FIG. 1 is a top front perspective view of the tire curing line assembly.

"Aspect Ratio" means the ratio of a tire's section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including beads, if used, on any alternative rim attachment.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Placement" means positioning a cord on a surface by means of applying pressure to adhere the cord at the location of placement along the desired ply path.

"Ply" means a layer of rubber-coated parallel cords.

"Radial" and "radially" mean directed toward or away from the axis of rotation of the tire.

"Radial Ply Tire" means a belted or circumferentially restricted pneumatic tire in which at least one ply has cords which extend from bead to bead and are laid at cord angles between 65° and 90° with respect to the equatorial plane of the tire.

"Section Height" means the radial distance from the nominal rim diameter to the outer diameter of the tire at its equatorial plane "Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

"Winding" means a wrapping of a cord under tension onto a convex surface along a linear path.

DETAILED DESCRIPTION OF THE INVENTION

Figure 2:
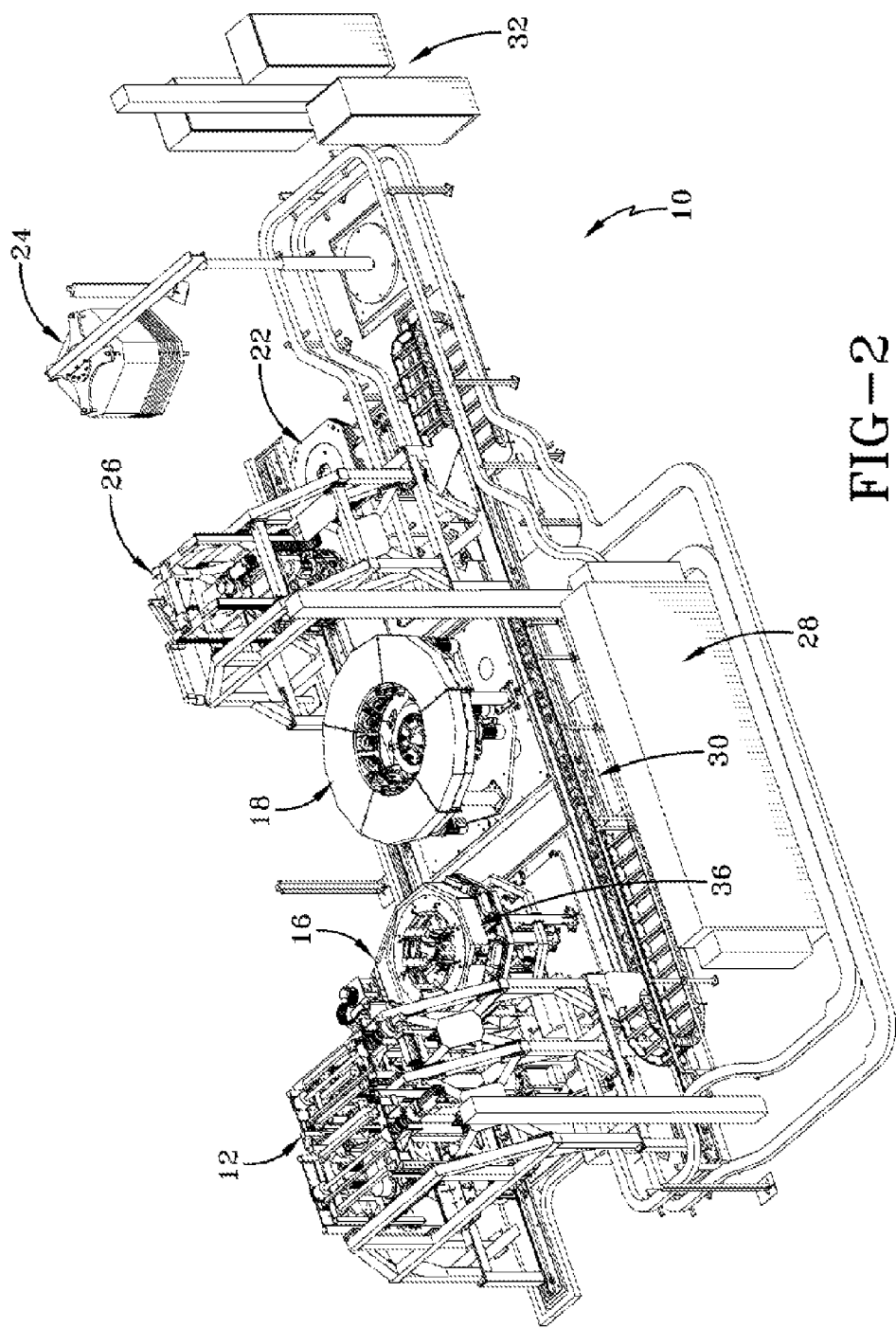
FIG. 2 is a top rear perspective view of the tire curing line assembly.

Referring initially to FIGS. 1 and 2, a curing line 10 is shown as part of an integrated tire manufacturing line. The curing line 10 includes a plurality of stations arranged in a linear array, however, other arrangements of the work stations may be utilized if desired to accommodate facility and production demands. The tire manufacturing line builds a tire from components applied to a segmented core dimensioned and configured close to the finished tire. In U.S. patent application Ser. No. 10/417,849, filed Apr. 17, 2003, entitled "A METHOD FOR CURING TIRES AND A SELF-LOCKING TIRE MOLD", incorporated by reference herein, a segmented mold for use in tire manufacture is described. The mold has a central axis; a plurality of radially movable tread forming segments; two sidewall forming plates, a top sidewall forming plate, and a bottom sidewall forming plate; a top locking breech ring having a plurality of circumferentially spaced means for locking the segments, each means for locking providing a predetermined angular path for radially contracting the segments upon closing the mold in a locked position. The segmented mold for molding a tire has an enlarged opening for accepting a green tire assembly. The mold can accept the green tire and its building core internally while maintaining the tire's as-built dimensions very close to the as-molded dimensions.

A mold according to U.S. patent application Ser. No. 10/417,849 may be used in conjunction with a tire building core assembly of the type and configuration disclosed in U.S. patent application Ser. No. 11/292,991 entitled "TIRE BUILDING CORE LATCHING AND TRANSPORT MECHANISM", filed Dec. 2, 2005 and U.S. patent application Ser. No. 11/293,397 entitled "HEATED TIRE BUILDING CORE ASSEMBLY AND METHOD", filed Dec. 2, 2005, likewise incorporated herein by reference. The construction of the core provides a positive mechanism for engaging and transporting the tire building core between a number of stations within an automated tire manufacturing line. Attachment points are located in each end of a spindle assembly of the core. The mechanism allows for automated attachment/detachment of a transport mechanism to the tire building core and facilitates a movement of the tire building core and green tire constructed thereon.

The curing line 10 is intended to be integrated into the tire manufacturing line described above and includes an upper core manipulator 12, upender apparatus 14, and a lower core manipulator 16 that operatively engage a tire building core and green tire assembly 15. The upper core manipulator 12 generally moves the core assembly 15 along the curing line 10 between a mold assembly station 18, a lower core manipulator 16, and upender apparatus 14. A mold manipulator transport assembly 26 bridges over the curing line and moves under electrical control from control panel 28 along a transport rail assembly 30. Induction heating control panels 32 are positioned adjacent the induction dome assembly 24 and electrically control the induction heating assembly 24 throughout each heating and cure cycle.

Figure 3:
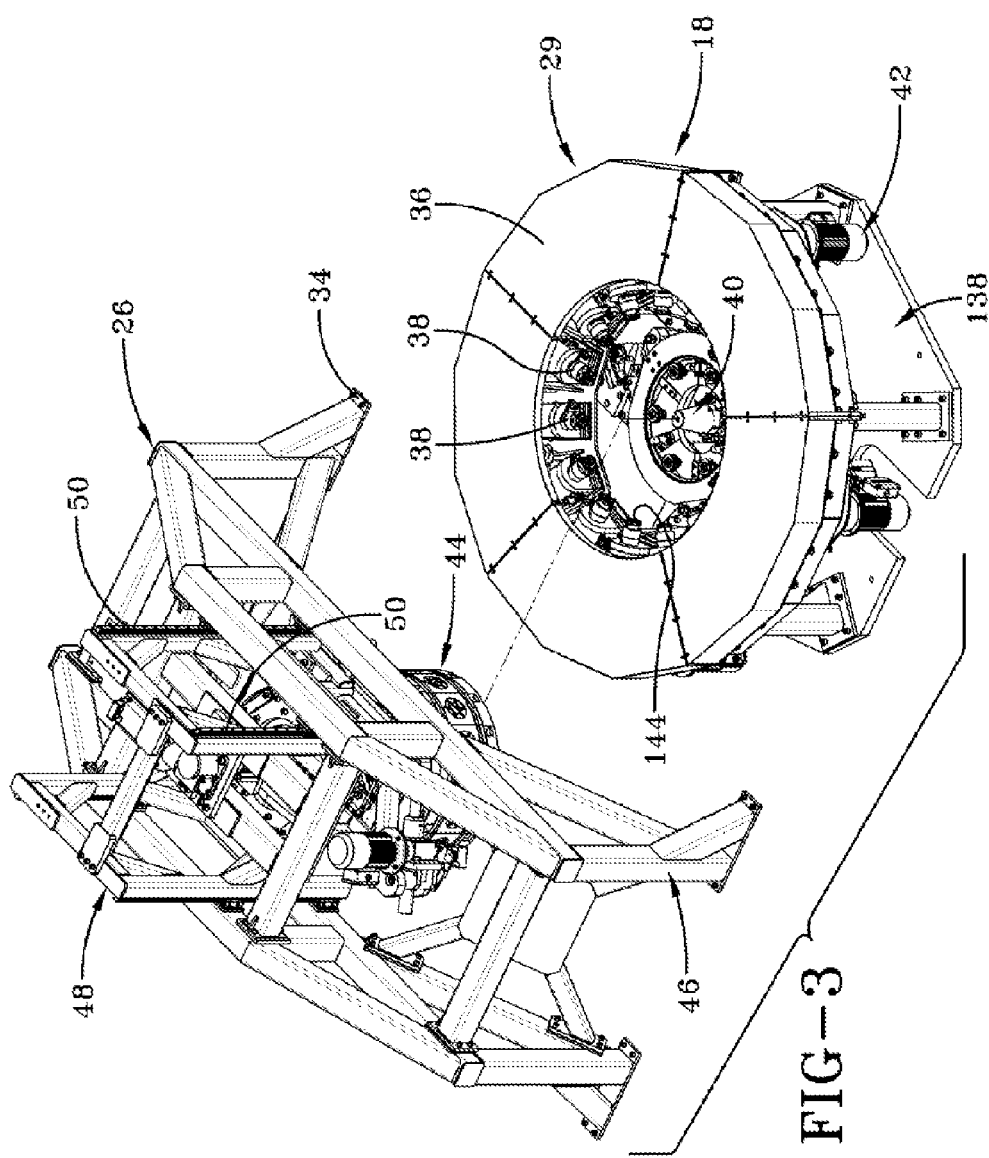
FIG. 3 is a top perspective view of the mold assembly station and mold manipulator assembly.
Figure 4:
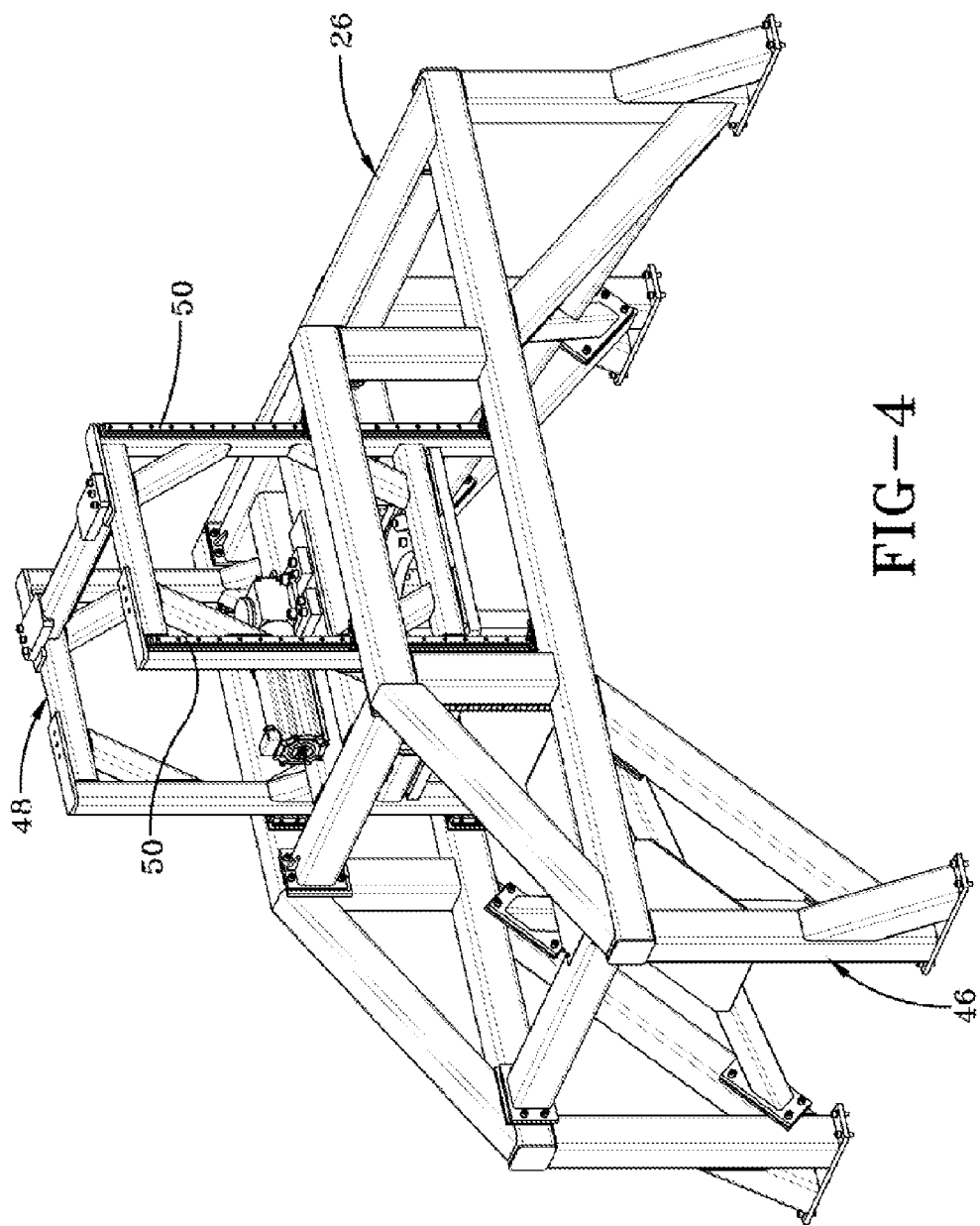
FIG. 4 is a front perspective view of the mold manipulator apparatus frame.
Figure 5:
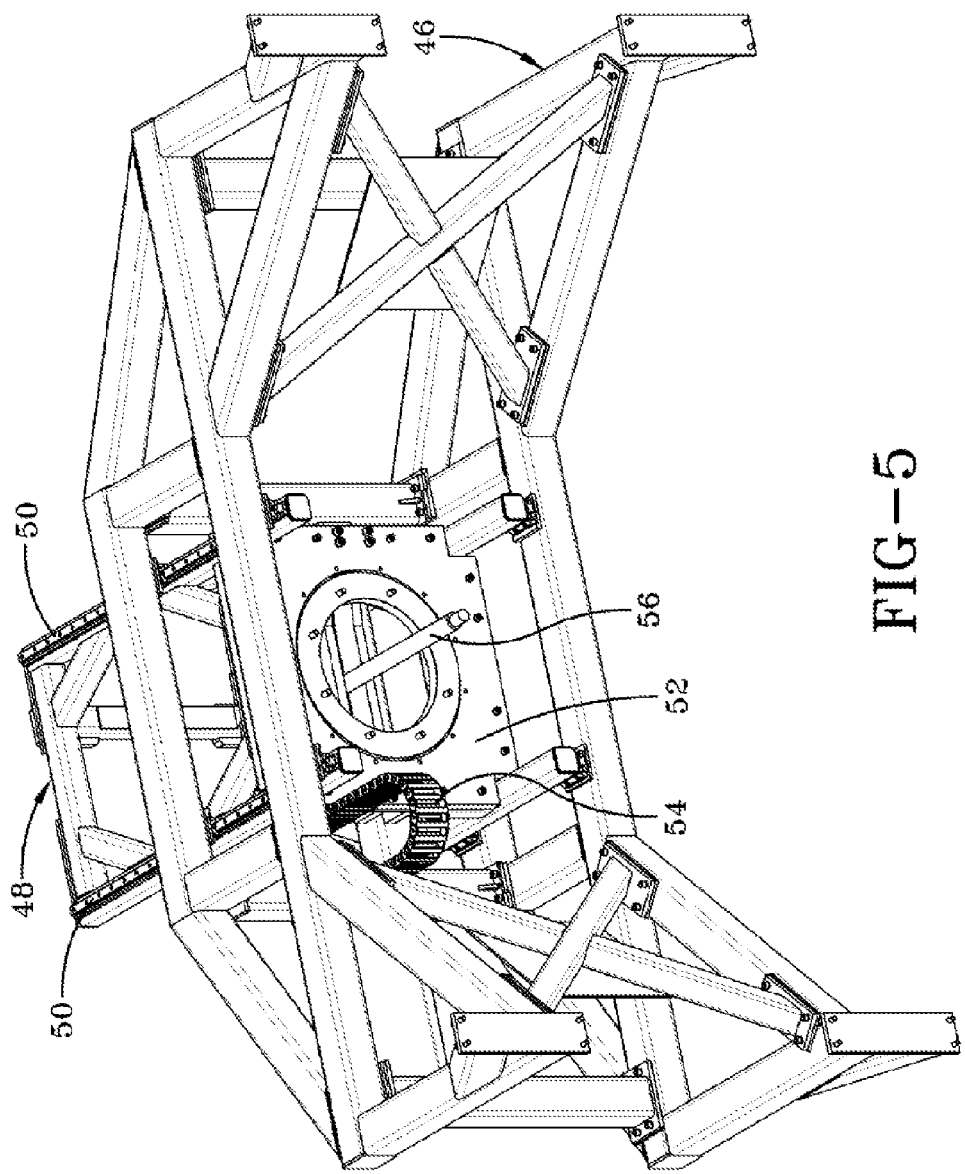
FIG. 5 is a bottom perspective view of the mold manipulator apparatus frame.

Referring to FIGS. 3, 4, and 5, as used herein, mold manipulating apparatus will be seen to include the mold manipulator transport assembly 26 in conjunction with the stationary mold assembly and disassembly apparatus 29 that is located at the mold assembly/disassembly station 18; and the mold storage stand 20. The mold assembly and disassembly apparatus 29 is a self-standing circular platform having upper circumferential cover members 36. Mounted beneath cover members 36 and forming a radially inward-directed circumferential array are fifteen tread segment manipulators 38. A core electrical plug in unit 40 is directed upwardly and positioned below and at the center of the circular array formed by the manipulators 38. Disposed at the bottom of the station 18 are five circumferentially spaced motors 42, each motor 42 driving three of the manipulators 38 as will be explained. A locking mold 44 is transported by the mold transporting apparatus 26 between the mold assembly station 18 and the cure station 22. The mold transporting apparatus 26 includes a bridging support frame 46 that supports an inner vertically elongate frame 48. The support frame 46 includes spaced apart legs 34 that have lower ends that slide along the transport rail assembly 30 between stations 18, 20 and 22. The inner frame 48 is centrally disposed within the bridging support frame 46 and moves reciprocally upward and downward along spaced apart vertical rails 50. The mold 44 is carried by the inner frame 48 and is raised and lowered thereby. The inner frame 48 includes a main mounting plate 52 and is supplied with electrical power via cabling within cable carrier 54. A ball screw 56 is mounted centrally within the frame 48 and is part of the jack assembly to move inner frame 48 up and down.

With reference to FIGS. 6, 7, 7A, and 8, a mold gripper assembly 58 is shown. The bottom, circular base plate 86 is a separate piece from the larger, square plate 61 that it and the guide devices mount to. (See FIG. 7A.) The large, square plate 61 is a part of the frame weldment like 84. Three spaced apart peripheral mold guide devices 60 mount to an underside of the plate 86 and depend therefrom. Each device 60 has a lock shaft 62 driven to rotate back and forth 90° total by a pneumatic cylinder 68. The plate 86 further includes six spaced apart peripheral V-rollers 64 that reciprocally rotate and guide an outer ring 66. An arm 70 is rotated by the cylinder 68 and rotates a pair of linkage arms 72, 74. Pivotally mounted to ring 66 are three pivot arms 76. The arms 76 are spaced apart and extend outward from a peripheral edge of the ring 66. The arms 76 pivot about a respective pin 80 and a pin 78 is secured to project downward from each arm 76. A pair of ball screw jacks 82 is coupled to rotate the outer ring 66. Rotation of the V-rollers 64 guides the ring 66. A top plate 84 is attached by bolts or other suitable means to the main mounting plate 52 best shown by FIG. 5. The centrally disposed plate 86 is coupled to a pair of hold-down assemblies 94. Three extension springs 88 are provided, one end of each spring attached to an actuation arm 90 attached to an arm 76 and the opposite spring end is attached to the ring 66. The extension springs 88 act to bias the arms 76 radially inward to impart an inward bias to the pin member 78 of each arm 76 in a radially inward direction. A cam follower 92 is positioned to engage and pivot arms 76 outward as ring 66 rotates to overcome the bias of the spring 88 attached to each arm 76. Pivotal movement of each arm 76 moves each pin 78 radially outward into an unlocked position as will be explained.

Figure 7:
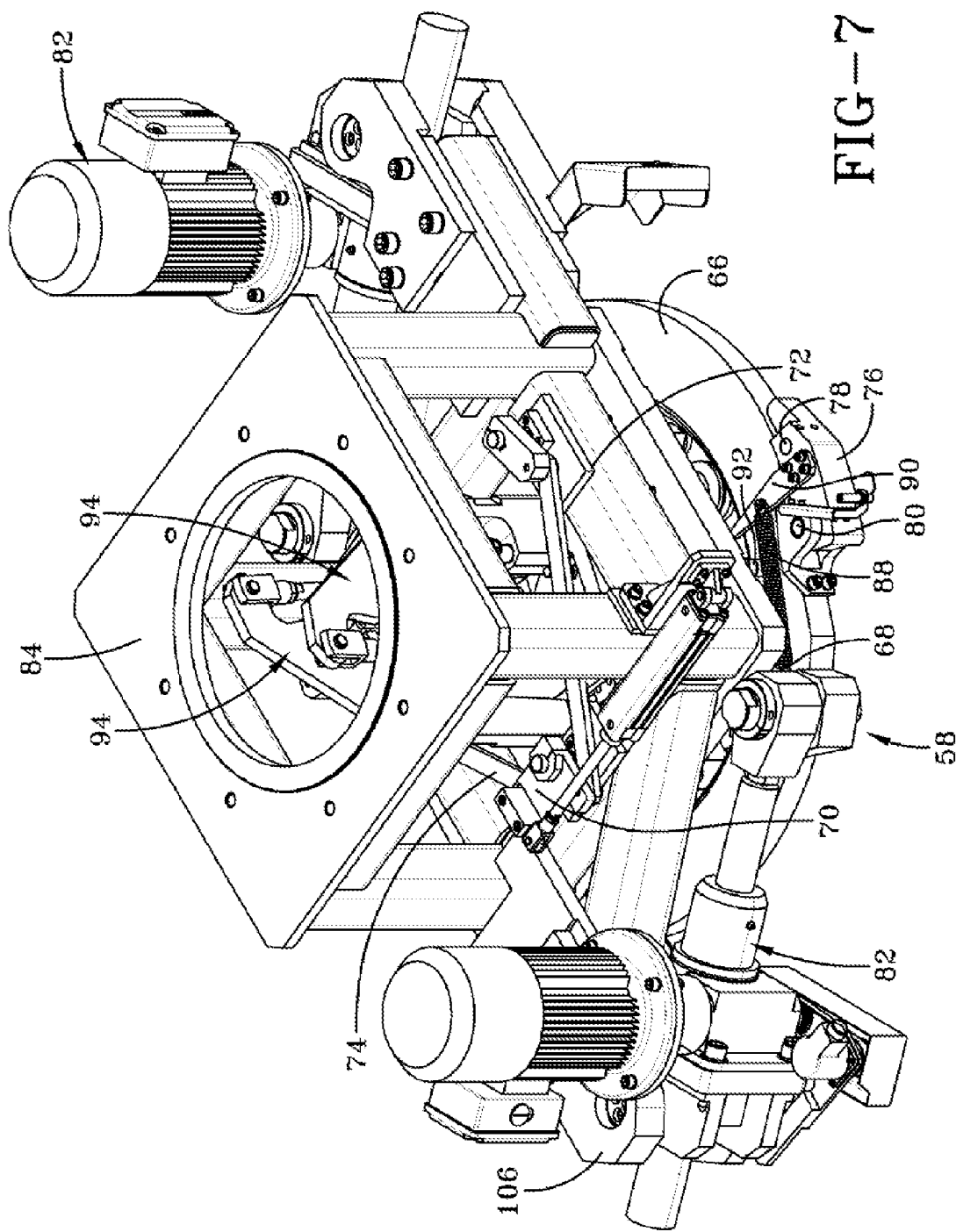
FIG. 7 is a top perspective view of the sub-assembly of FIG. 6.
Figure 7A:
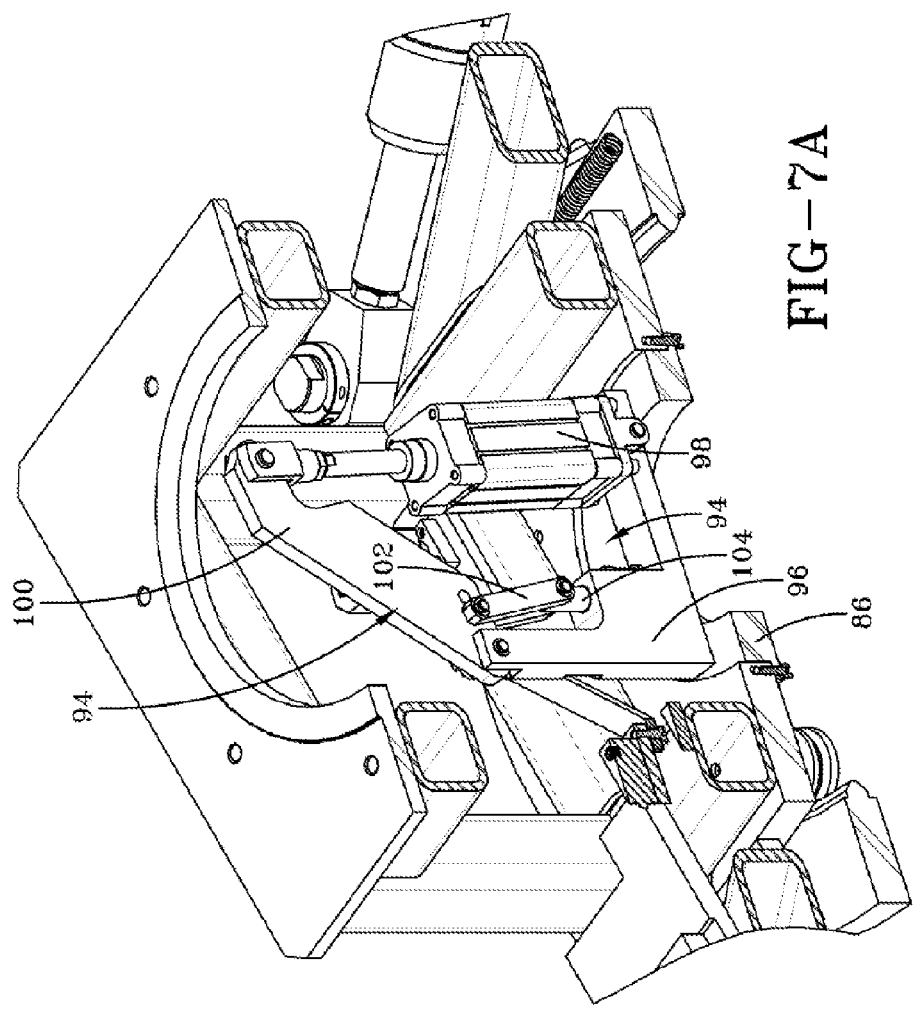
FIG. 7A is a partial top perspective view of a hold-down sub-assembly within the sub-assembly of FIG. 6, portions of which being removed for the purpose of illustration.

FIG. 7A shows in detail the two hold down devices 94 (one of which is shown). Each device 94 includes a base bracket 96 to which a pneumatic cylinder 98 is attached. An arm 100 is linked to the cylinder 98 and raises and lowers a linkage arm 102 coupled to a hold down shaft 104. The shaft 104 thereby moves vertically into an engagement with the top of the core spindle 100. The device 94 operatively functions to push down against the top core spindle 108 when the first sidewall assembly 118 is lifted to prevent the core being stuck and lifted (during demolding).

Figure 10:
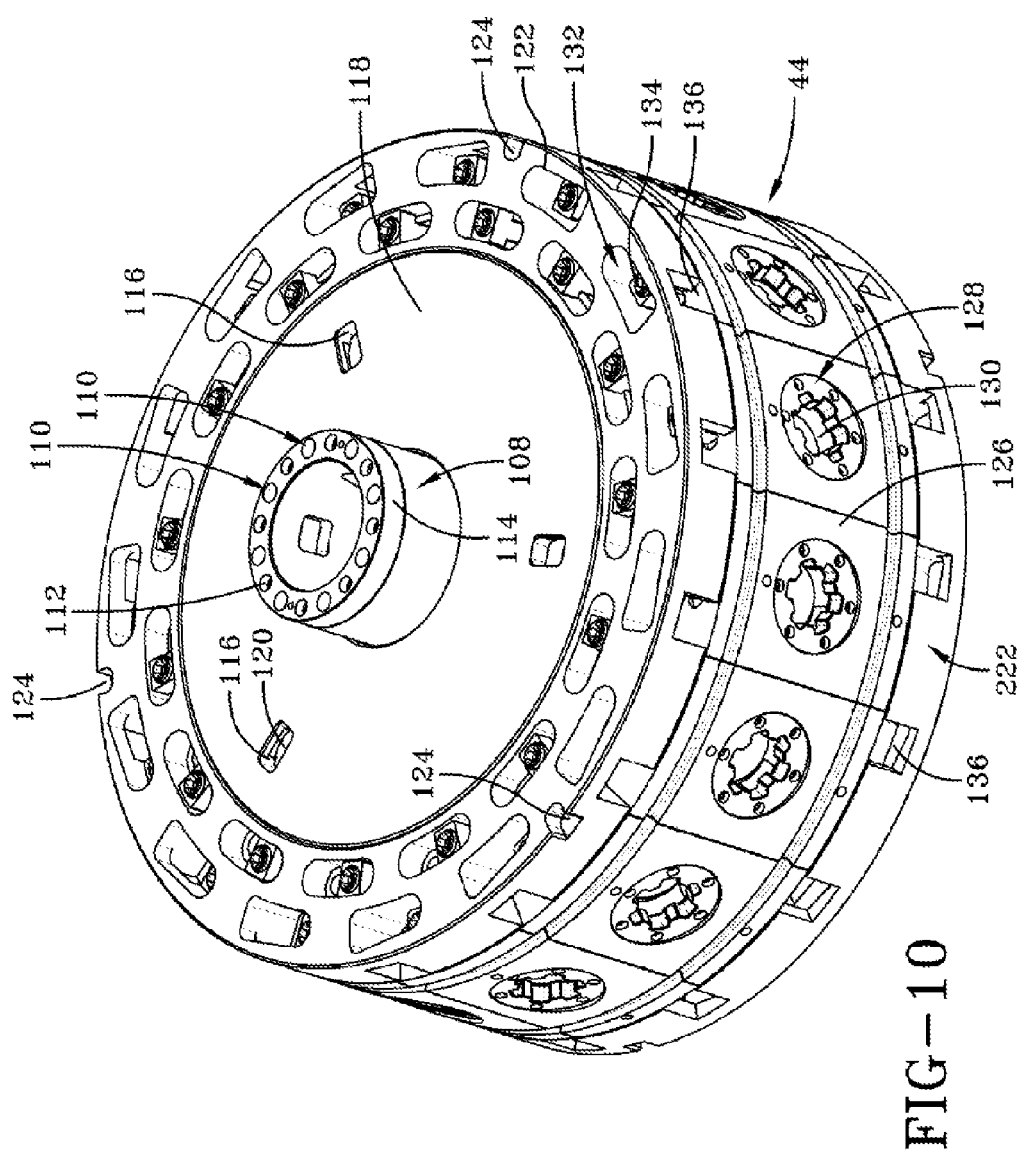
FIG. 10 is a top perspective view of a segmented mold.
Figure 12:
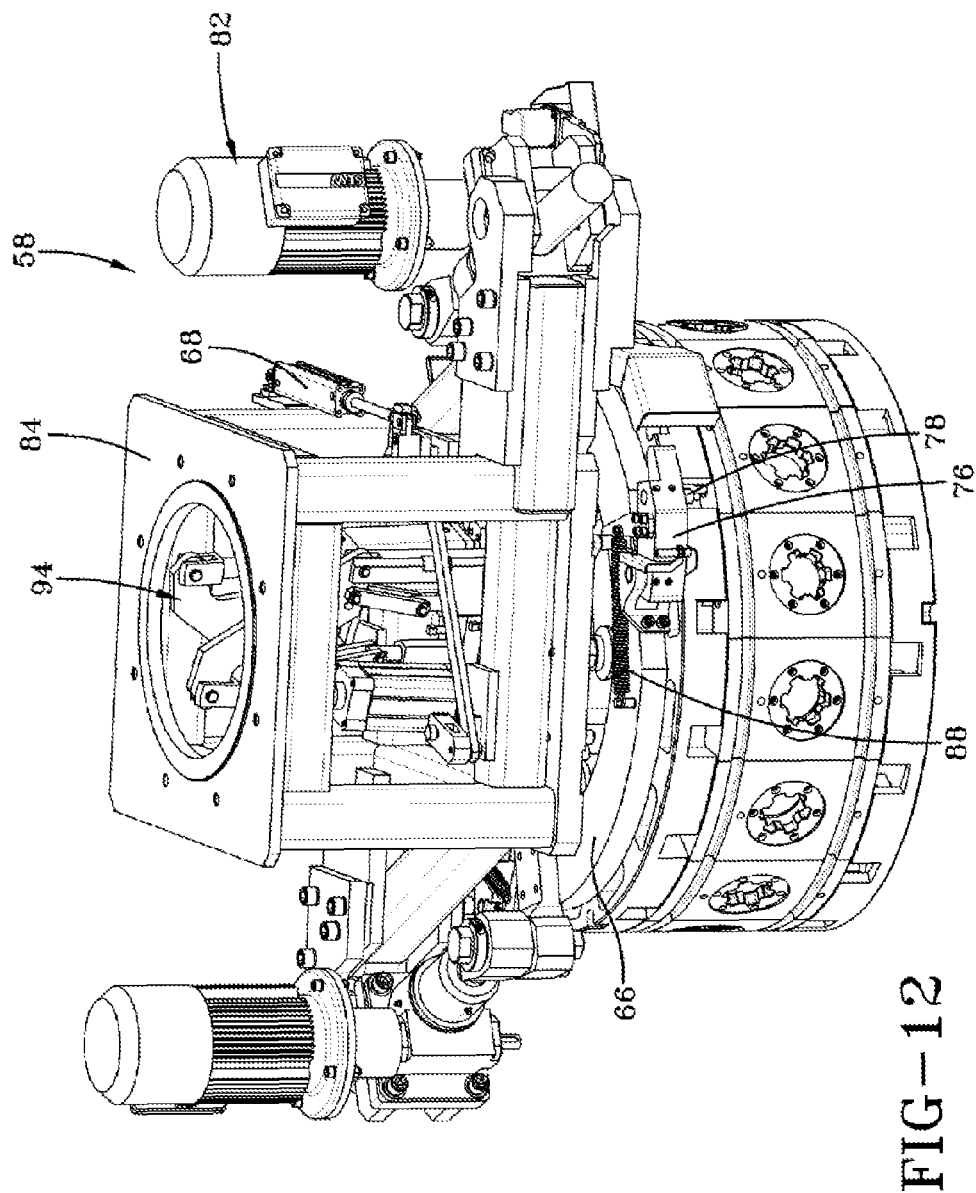
FIG. 12 is a perspective view sequential to FIG. 11 showing the upper sub-assembly of the mold gripper assembly lowered onto the segmented mold.
Figure 12A:
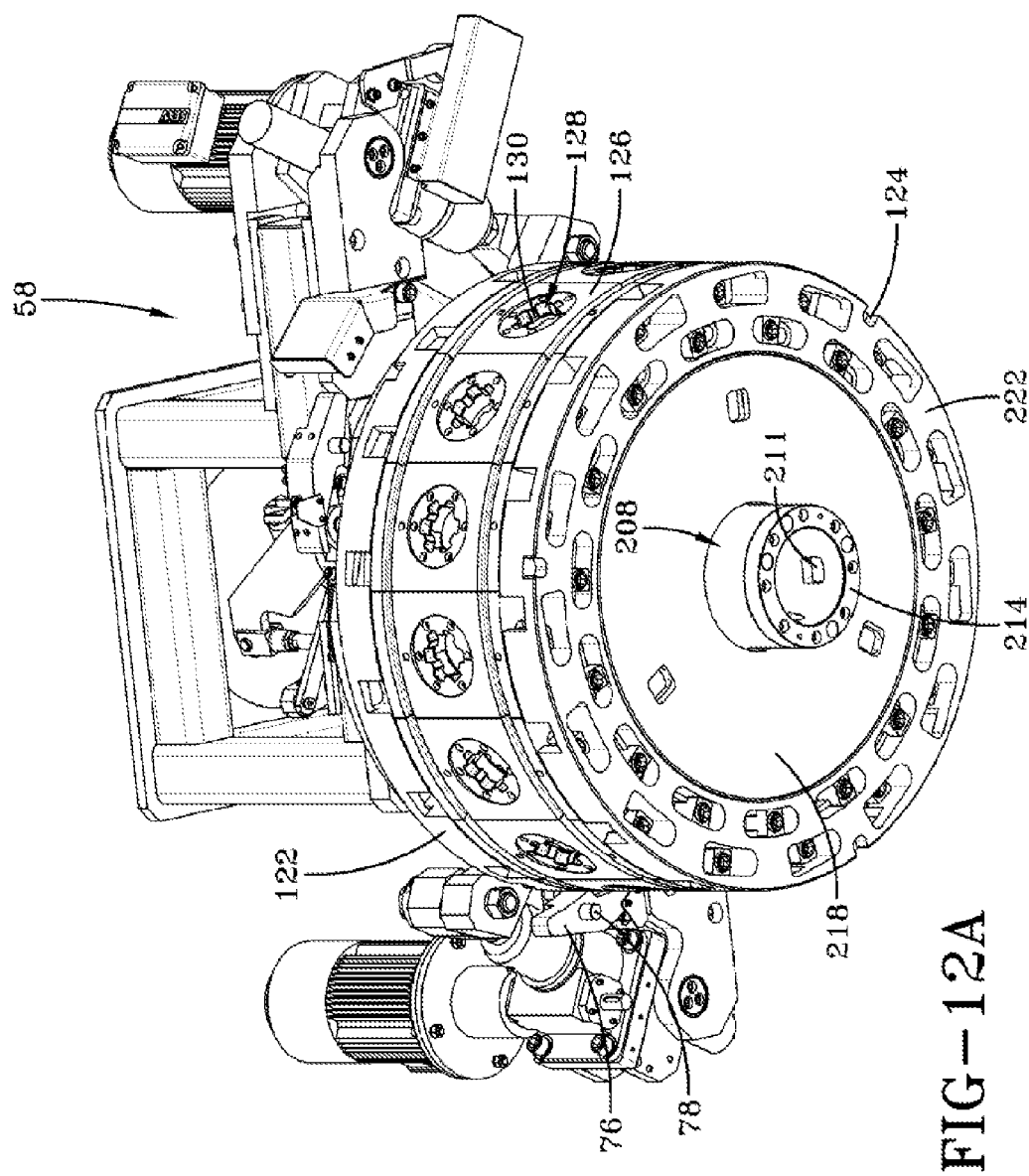
Figure 14:
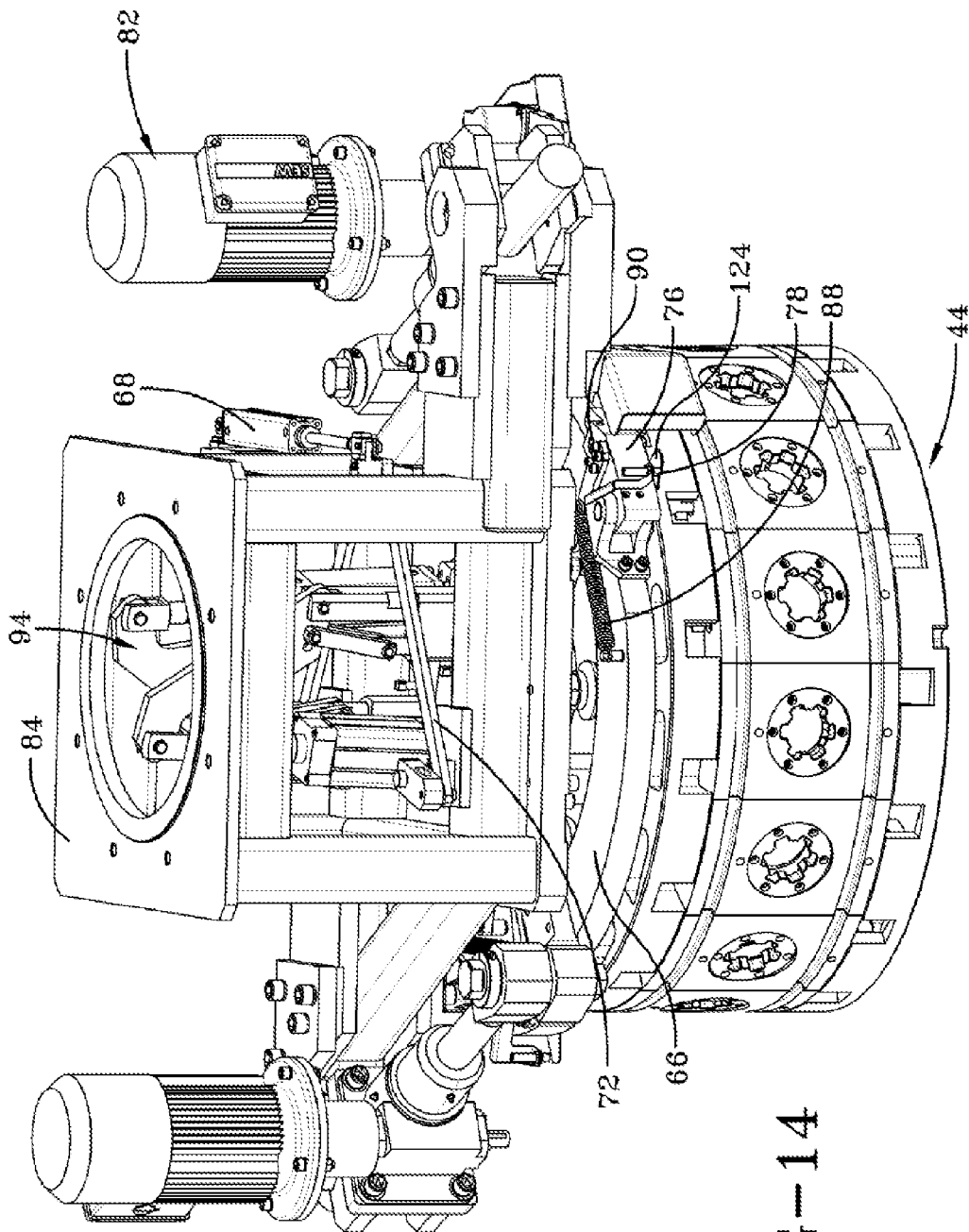
FIG. 14 is a view sequential to FIG. 13 showing further rotation of the upper gripper ring.
Figure 14A:
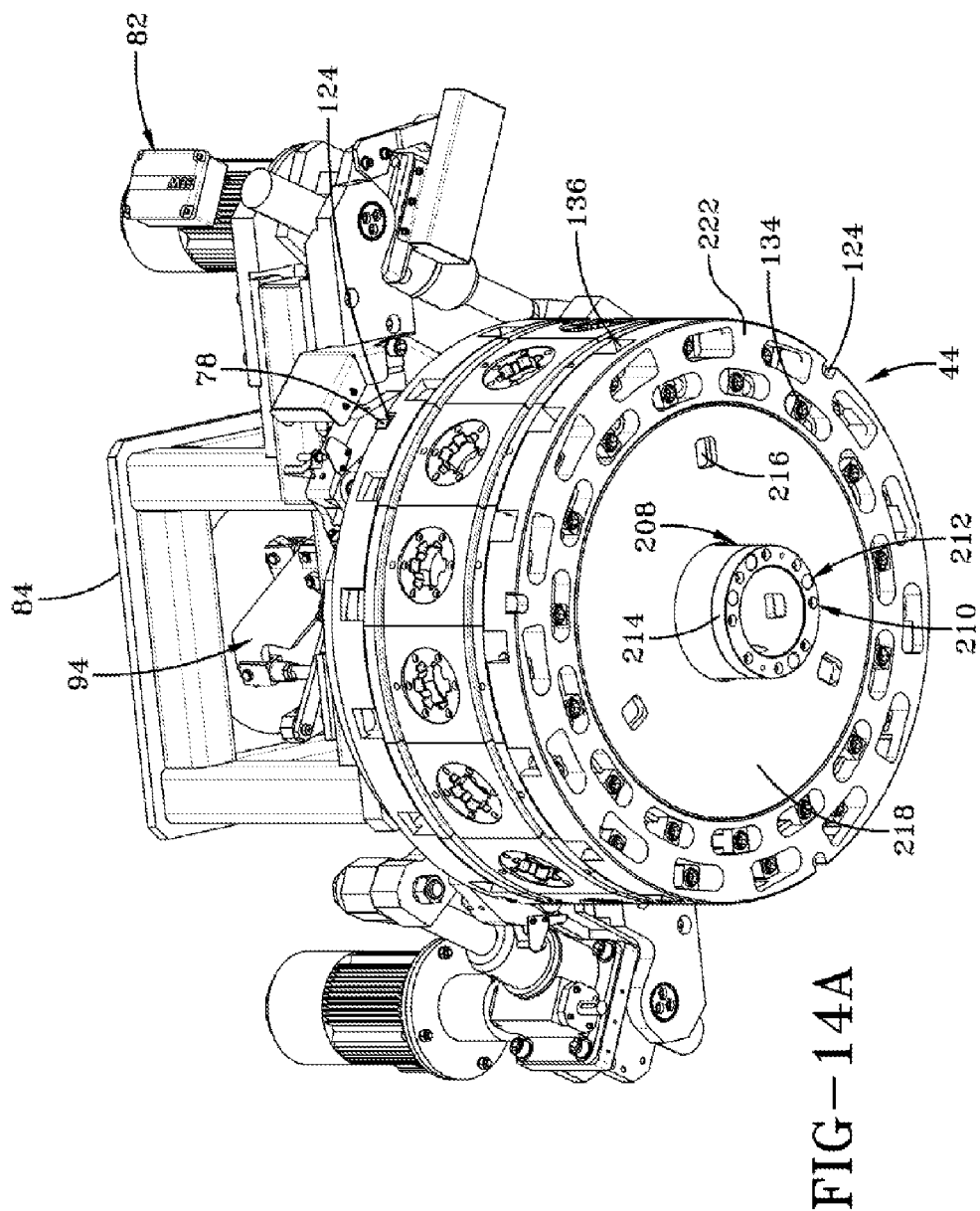

FIG. 10 shows an assembled segmented mold 44 and FIGS. 12A and 14A show the assembled mold 44 from an underside perspective. The mold receives and encloses a tire building core assembly 15 that includes an axial spindle assembly. The spindle assembly includes an outwardly directed top core spindle 108 and an outwardly directed bottom core spindle 208. The core assembly 15 further includes a toroidal tire building surface formed by the outer surfaces of assembled core segments. The spindles 108, 208 project upward and downward, respectively, from the mold 44 as shown. The mold has a plurality of radially movable tread segments 126, a bottom sidewall forming plate assembly 218 and a top sidewall forming plate assembly 118. The top and bottom sidewall forming plate assemblies 118, 218 are retained by a top breach lock ring 122 and a bottom breach lock ring 222. Both the bottom breach locking ring 222 and the top breach locking ring 122 have slotted openings which permit a threaded fastener bolt with a bolt collar (132) to pass during the opening and closing of the breach locking rings 122, 222. The top and bottom breach locking rings 122, 222 also have an inner ring of slotted openings for retaining the upper or top sidewall forming plate 118 and the bottom sidewall forming plate 222. A segmented mold of the subject type is disclosed in U.S. patent application Ser. No. 10/417,849 incorporated above in its entirety by reference.

A plurality of thermocouple receiving sockets 110, numbering eight in the embodiment shown, extend into the upper projecting spindle 108. The sockets 110 each receive an electrical connector that is then coupled to a thermocouple in the tire building core, allowing the core temperature to be monitored and controlled within the mold. In addition, each spindle 108, 208 includes a plurality of bolt holes 112, 212 (numbering eight in the embodiment shown) that receive bolts attaching a flange 114, 214 to the spindle end. A series of spaced apart notches 124 (three in the embodiment shown but not limited thereto) are formed to extend into an outer peripheral edge of each of the top and bottom breech locking rings 122, 222. The upper sidewall mold segment plate 118 and lower sidewall mold segment plate 218 each have a set of notches 116 (three in the embodiment shown but not limited thereto) positioned inward from an outer edge of the each plate. Within each notch 116 is an internal undercut 120 that is engaged by the gripper assembly 58.

The mold 44 further includes a peripheral circumferential array of tread segments 126, numbering but not limited to fifteen in the embodiment shown. Within an outer wall of each segment 126 is an insert 128 formed of suitably hard material such as hardened steel. There is a through, star-shaped hole in the insert. There is a blind, round hole in the tread segment 126 behind the insert for clearance. A peripheral array of T-nuts 134 are provided that engage peripheral spaced apart bolt sockets 132 within a top surface of each ring 122, 222. Circumferential notches 136 extend through the peripheral side of each breech locking ring 122, 222 to communicate with a respective socket 132.

Figure 16:
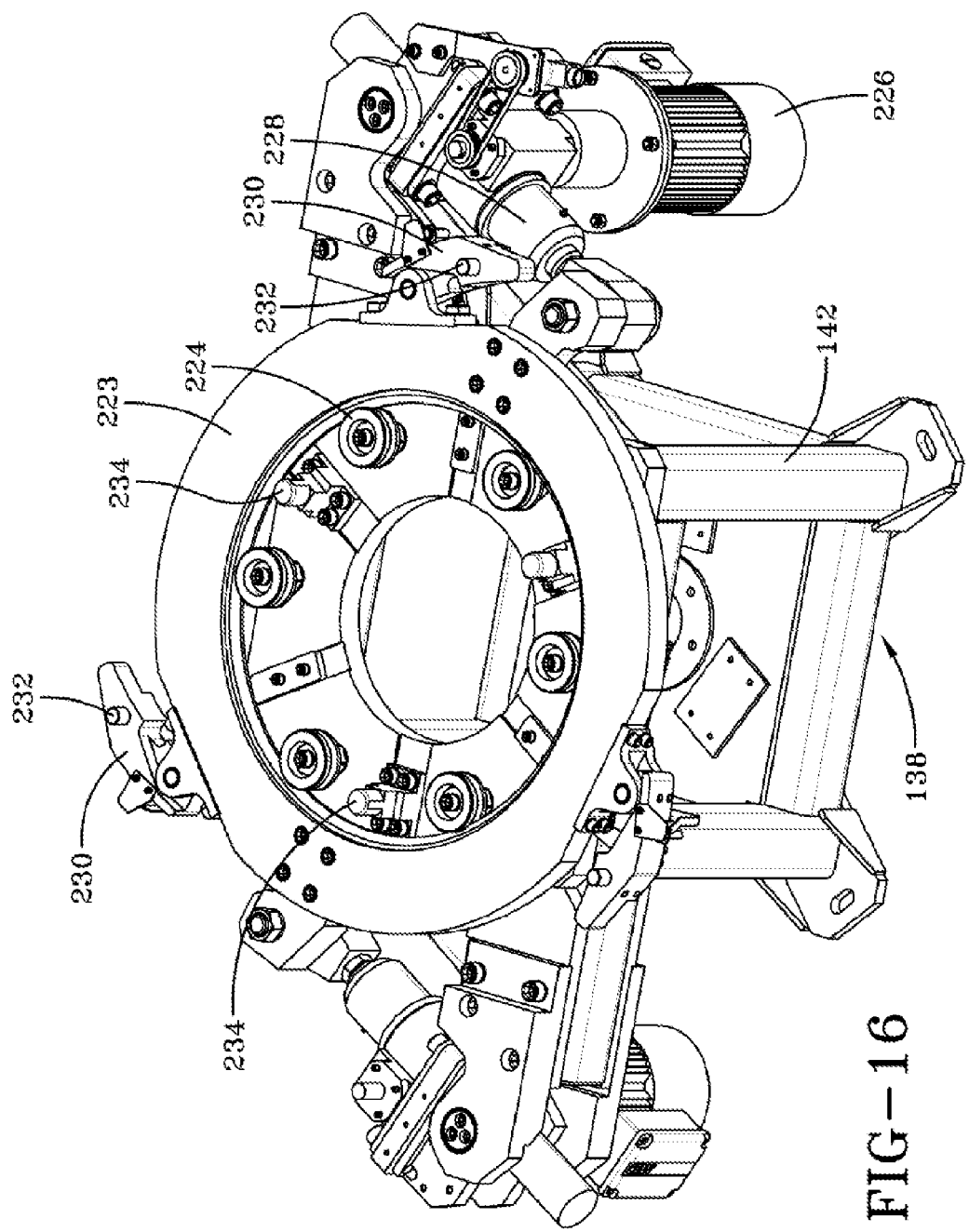
FIG. 16 is a top perspective view of a lower stand sub-assembly of the gripper assembly.
Figure 17:
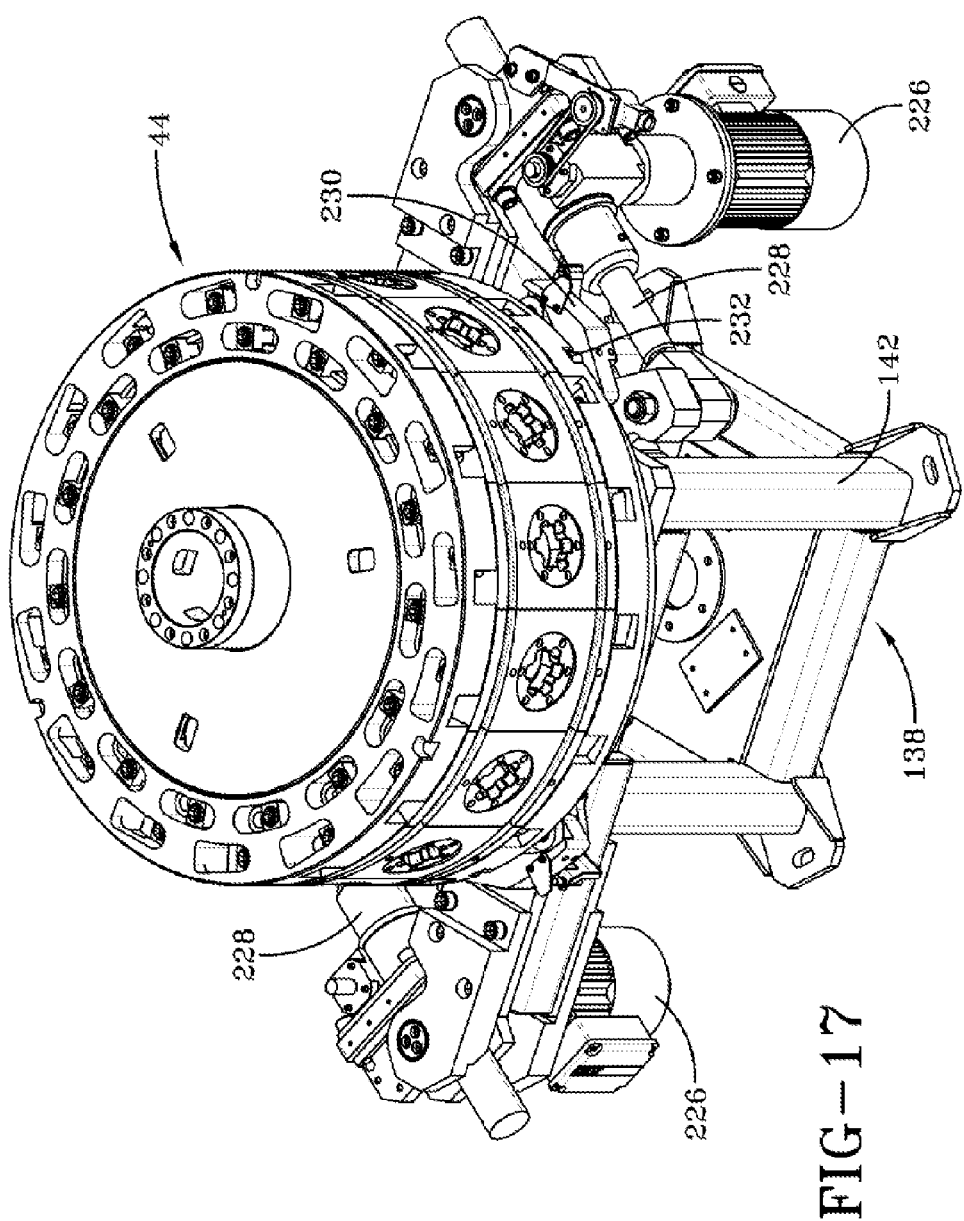
FIG. 17 is a top perspective view of a segmented mold lowered onto the lower stand sub-assembly.

With reference to FIG. 16, a mold loading stand 138 represents a lower assembly within the mold assembly/disassembly apparatus. The stand 138 supports an upper ring plate 223 reciprocally rotated by six V-rollers 224 that are spaced apart circumferentially adjacent an internal opening of the ring 223. Spaced apart adjacent an outer edge of the ring 224 are pivotal lever arms 230, each supporting an upwardly directed pin 232. The ring 224 is rotated by two motors 226 through ball screws 228. The arms 230 and the ball screw actuation system therefore are of general like-configuration to the previously described pivot arms 76 associated with the upper rotating ring 66 of the gripper assembly (see FIGS. 7, 11). The ring 223 is elevated by the frame weldment 142. Three stationary pin members 234 are spaced generally 120 degrees apart within an inner opening of the ring 223 as shown by FIG. 16. FIG. 17 shows the assembled segments 44 positioned upon the mold loading stand 138.

FIGS. 18-21 inclusive show the configuration of the tread segment manipulating sub-assembly 144. The sub-assembly 133 is free standing supported by a floor plate 146. A support plate 147 is suspended in an elevated position by the floor plate 146. The sub-assembly 144 includes a circumferential array (fifteen but not limited thereto as shown) of adjacent tread segment manipulators 38. Each manipulator 38, as best seen from FIGS. 19 and 19A, includes an actuator carriage weldment 148 and a forwardly projecting latching mechanism 150. The latching mechanism supports a circular star latch 152 at a forward end of the manipulator 38, reciprocally rotated by a pneumatic cylinder 154 through linkage 156 and drive shaft 158. The shaft 158 couples to actuator arm 160 through linkage 162. The star latch 152 may be reciprocally rotated about a longitudinal axis of the manipulator 38. A ball screw jack 164 is further coupled to each manipulator 38 to drive the carriage 148 along a pair of spaced apart rails 166 reciprocally between a radially inward (forward) position and a radially outward (retracted) position.

Figure 20A:
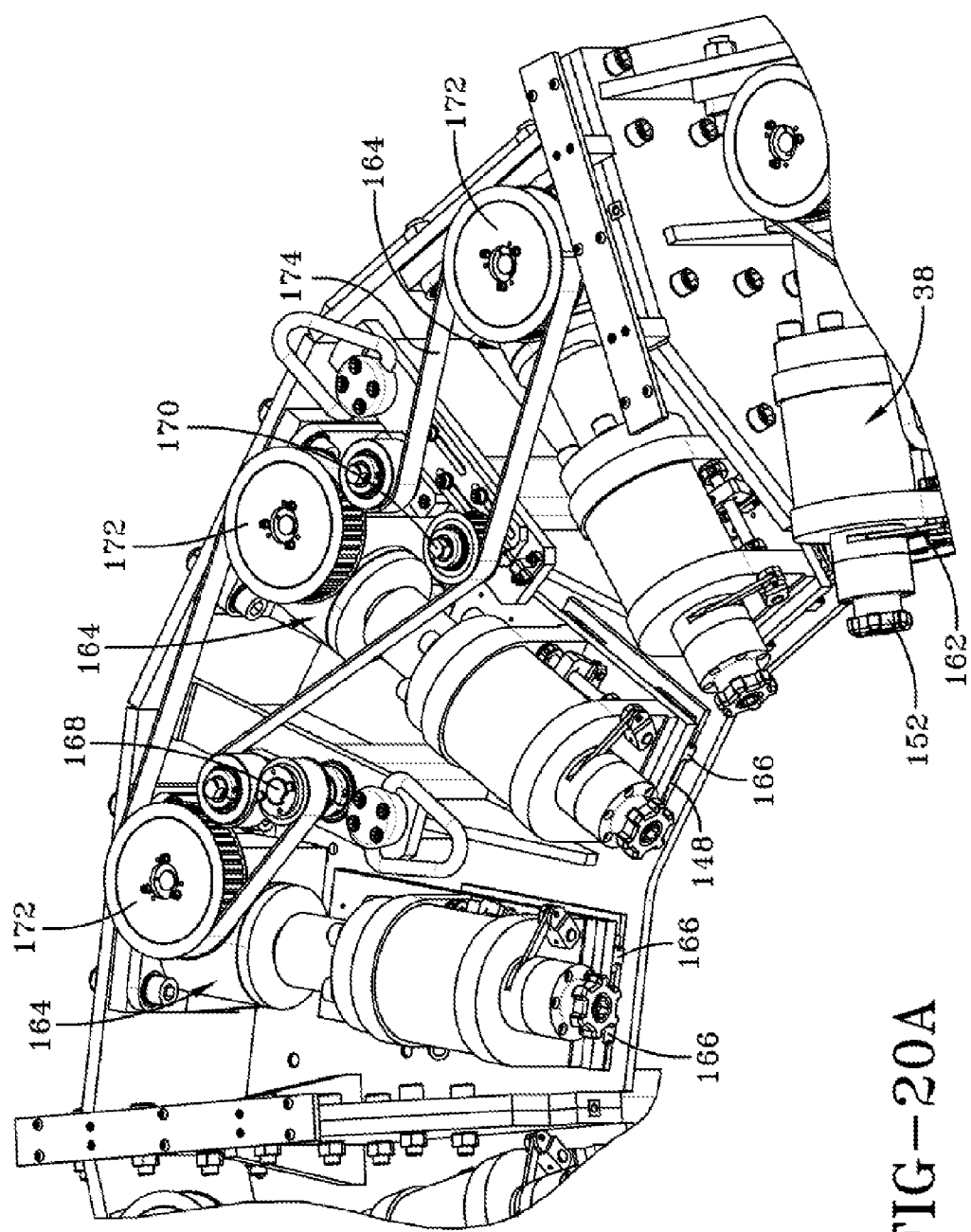
FIG. 20A is an enlarged perspective view of a portion of the tread segment manipulating sub-assembly of FIG. 20.
Figure 21:
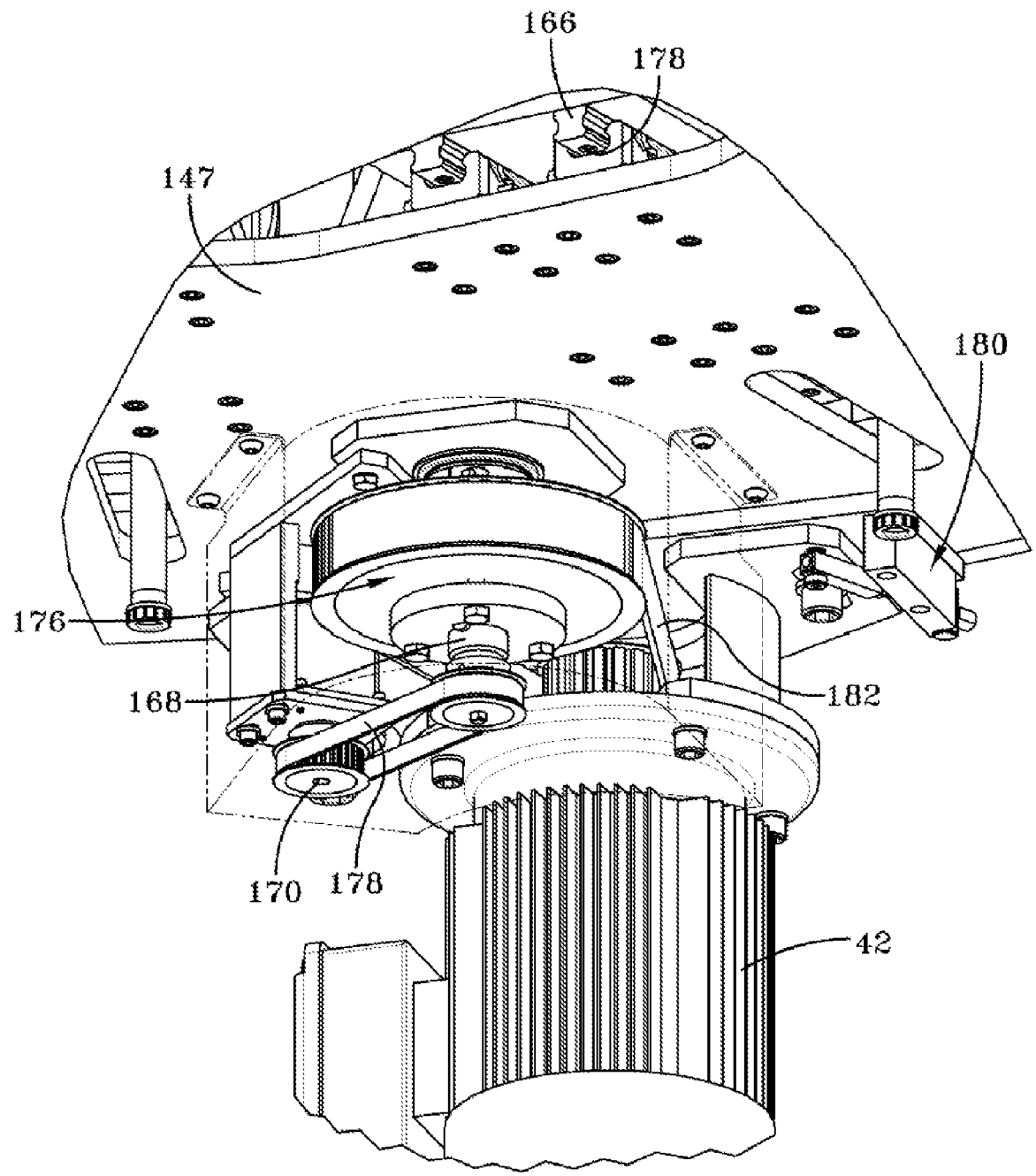
FIG. 21 is a bottom perspective view of a portion of one tread segment manipulating device.

Movement of the carriage 148 for each manipulator 38 will be understood from FIGS. 20A and 21. Five motors 42 are mounted to an underside of the support plate 147, each motor 42 driving three of the tread segment manipulators 38 between the forward and retracted positions. Each motor 42 rotates a drive shaft 168 through a belt drive 176. The drive shaft 168 then rotates three driven pulleys 172 that are coupled together by belt 174. Each of the driven pulleys 172 operates a ball screw jack 164 to move a tread segment manipulator 38. Tensioner assembly 180 tensions belt 182 by moving motor 42, and moveable pulley 170 tensions belt 174. An encoder provides rotational position feedback and is driven by a belt drive 170, 171 from the drive shaft 168. Each of the manipulators 38 is thus moved radially inward into engagement with the tread forming segments 126 of the mold 44, the star latch 152 of each manipulator 38 entering a respective star socket 130. Rotation of the star latch 152 locks the latch in place and enables the tread forming segment 126 to be radially withdrawn as the manipulator 38 is radially retracted. The tread segments of the mold 44 are thus disassembled radially outward. Reversing the sequence brings the segments 126 radially inward and back into an assembled configuration. The tread segment sub-assembly of the mold gripper assembly 58 thus cooperates with the sidewall segment manipulating apparatus to assemble and disassemble the mold 44.

Figure 22:
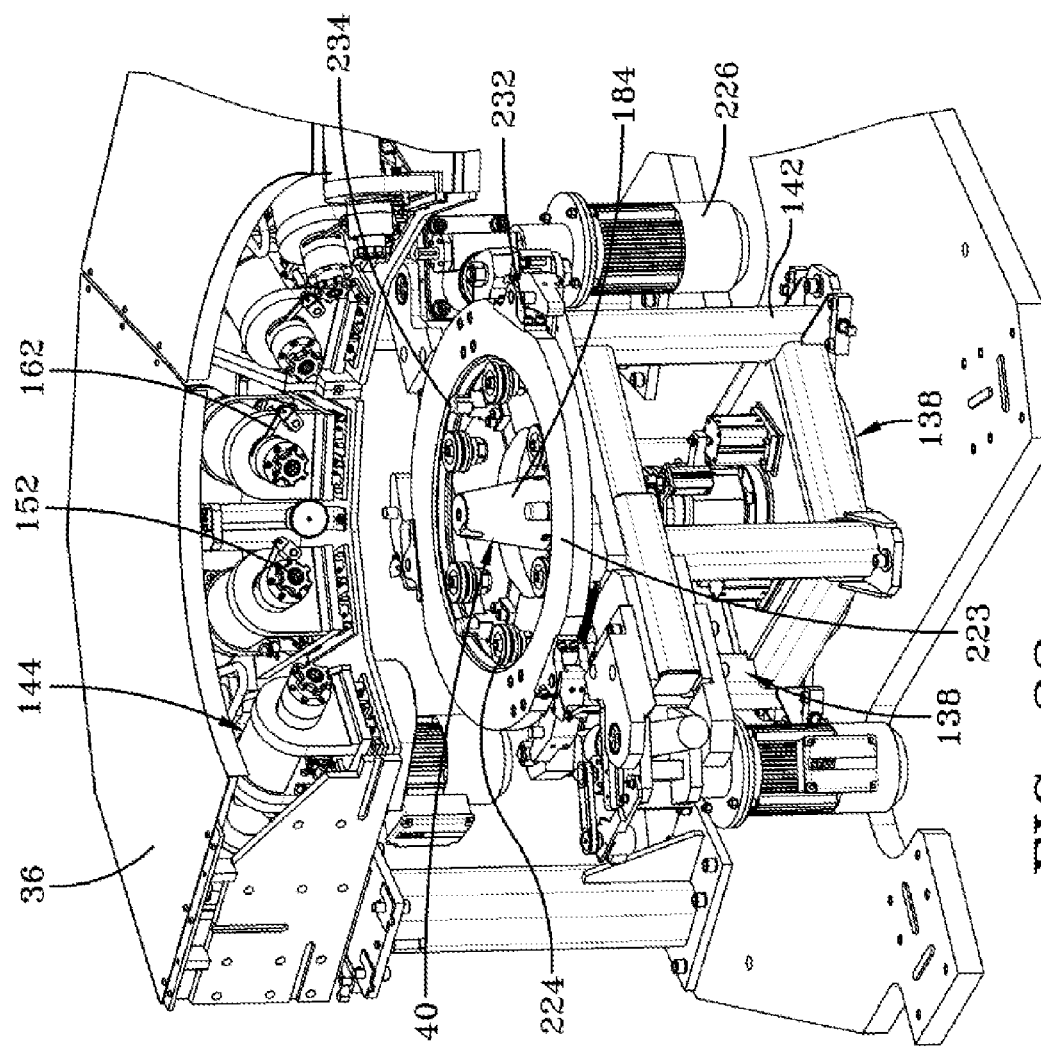
FIG. 22 is a partial perspective view of the tread segment manipulating sub-assembly, lower gripper sub-assembly, and core electrical plug-in apparatus.
Figure 23:
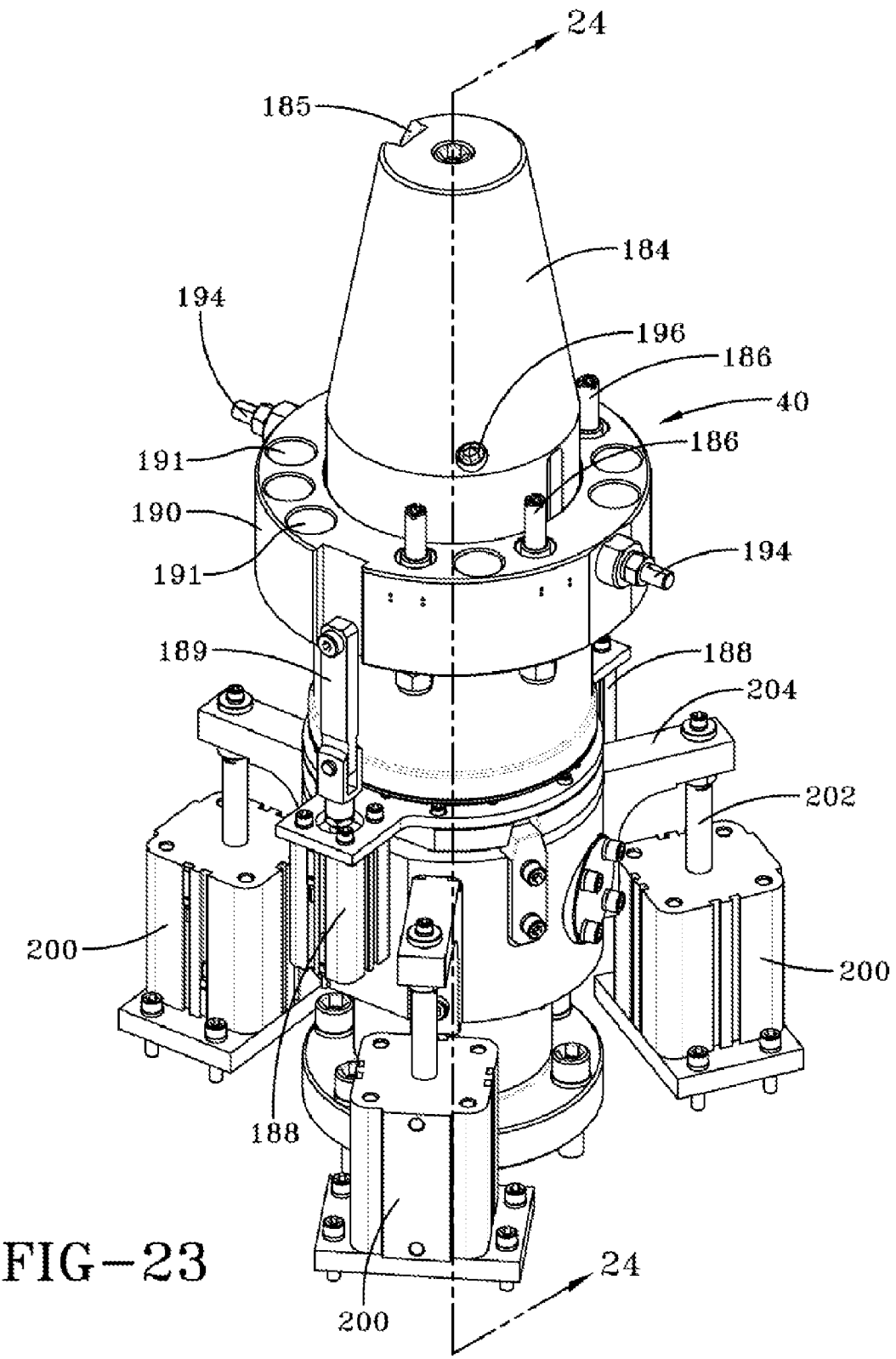
FIG. 23 is an enlarged perspective view of the core electrical plug-in apparatus.
Figure 24:
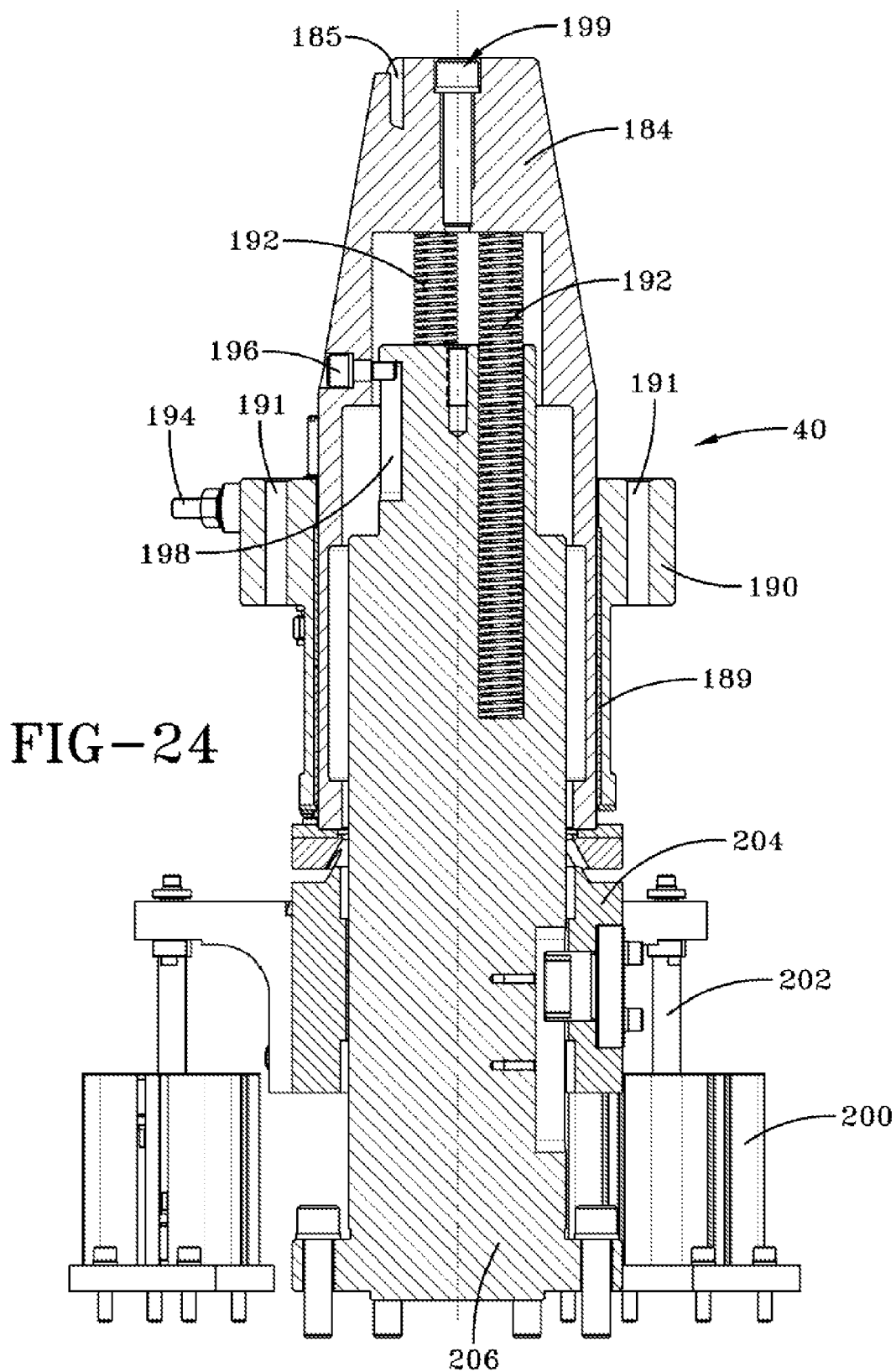
FIG. 24 is a longitudinal section view through the core electrical plug-in apparatus of FIG. 23 taken along the line 24-24.

Referring to FIGS. 22, 23, and 24, the core/electrical plug in apparatus 40 is shown positioned centrally within the mold loading stand 138 that is below the central opening of the tread segment closer sub-assembly 144. The apparatus 40 includes an upwardly projecting frustro-conical nose 184; a connector ring 190 surrounding a base end of the nose 184; multiple spaced-apart electrical connectors 186 in the form of pins spaced around and projecting from the ring 190 axially parallel with the nose 184; and a pair of actuation cylinders 188 linked to the ring 190 through linkage arms 189 and driving the ring 190 between an extended position and a retracted position. The nose 184 has an axially extending keyway 185 extending in an outer surface from a forward end. Three die springs 192 are mounted within the apparatus 40 oriented axially. An anti-rotation cam 194 is provided to align connectors within the lower core spindle 208 with the connectors 186 in the apparatus 40 as the spindle 208 receives the nose 184. The nose 184 is spring mounted to a center post 206. Springs 192 are placed in compression as the nose 184 is engaged and received into a downwardly open socket of the lower core spindle 208. Screw 196 rides within slot 198 to assist with maintaining alignment of the nose 184 on the post 206 as the nose moves downward under a spindle load and upward upon removal of the spindle 208. An axial bolt 199 resides within the nose 184 end. The bolt 199 shown is a plug. It would be removed and a smaller diameter, longer one substituted to thread into the hole in 206. This allows the springs 192 to be compressed and the screws 196 to be removed to disassemble/assemble the mechanism. Three pneumatic cylinders 200 are spaced about the center post and are coupled through shafts 202 to a housing 204 that encases the center post 206. Cylinders 200 actuate an upward and downward movement of the apparatus 40. The apparatus 40, 138, 144 shown in FIG. 22 represents a lower apparatus of the mold assembly/disassembly apparatus.

The tire curing mold assembly and disassembly station 18 as explained previously is a part of the cure line assembly 10. Its purpose is to transport a self locking mold 44 from the cure station 22, open the mold 44 so that the core transport assembly can remove the tire building core and cured tire and replace it with a tire building core and uncured tire, reassemble the mold 44 and transport the self locking mold back to the cure station 22. All of this activity is preferably to be preformed in a totally automatic mode without a machine operator. U.S. patent application Ser. No. 11/293,397 discloses a tire building core and is incorporated herein by reference. U.S. patent application Ser. No. 10/417,849 discloses a self locking mold and is incorporated herein by reference.

The cure line is shown in FIGS. 1 and 2. As shown in FIGS. 1 and 2, the stations of the cure line are from right to left: the tire upender 14, partially hidden by the upper core manipulator 12 mounted on the cure line rail transport assembly 30. The core assembly 15 is presented to the upender station 14 in a pivot axis-horizontal orientation from the tire building station (not shown). In the tire building station, the tire building core is rotated about a major horizontal axis and a green tire is constructed on the core as it rotates. Upon completion of the tire building operation, the tire building core and green tire are presented to the upender station 14 where the core assembly 15 is upended into a pivot axis-vertical orientation. After the core assembly 15 is upended, the upper core manipulator 12 carries the core assembly 15 down the rail system 30 to the mold assembly station 18. The mold assembly station 18 is located adjacent the mold loading and storage station 20, shown with the mold transport assembly (also referred herein as the mold manipulator assembly 26) positioning a mold 44 above station 20. The mold manipulator assembly 26 moves reciprocally along the rail system 30 between stations in the cure line 10.

The cure station 22 is positioned further along the curing line 10 and a jib crane 236 positions the induction curing dome 24 over the cure station 22 during the tire curing procedure.

FIG. 3 shows the mold assembly/disassembly apparatus 29 that is positioned at the tire curing mold assembly and disassembly station 18. The station 18 is comprised of two main assemblies. The mold assembly apparatus 29, which is fixed to the cure line foundation plate assembly, and the mold manipulation assembly 26, which is connected to the cure line rail transport assembly 30, and moves between the cure station 22, the mold storage/load stand 20, and the mold assembly station 18. The connection to the cure line transport rail assembly is not shown for clarity in FIG. 3.

The mold manipulation assembly 26 is comprised of two subassemblies, the mold transport frame assembly 46 and the mold gripper assembly 58. FIGS. 4 and 5 show two views of the mold transport assembly 46. It consists of a lateral frame attached to the cure line transport assembly 30 and a vertically moveable inner frame 48 that is mounted on linear guides or rails 50 and moved by a commercial ball screw jack and servo motor 56. The function of this subassembly 48 is to lift and lower the mold gripper assembly 58 and self locking mold 44 so that they can be moved between the mold assembly/disassembly station 18, the mold storage/load stand 20, and the cure station 22.

The mold gripper subassembly 58 has two functions. The first is to engage and disengage latches which attach the mold gripper subassembly 58 to the top sidewall plate 118 of the self-locking mold 44 for lifting. This also allows the upper sidewall plate assembly 118 of the self-locking mold 44 to be lifted and removed from the rest of the mold during the mold assembly/disassembly process. The second function is to rotate the upper sidewall breech ring 122 to lock or unlock the self-locking mold 44.

Figure 6:
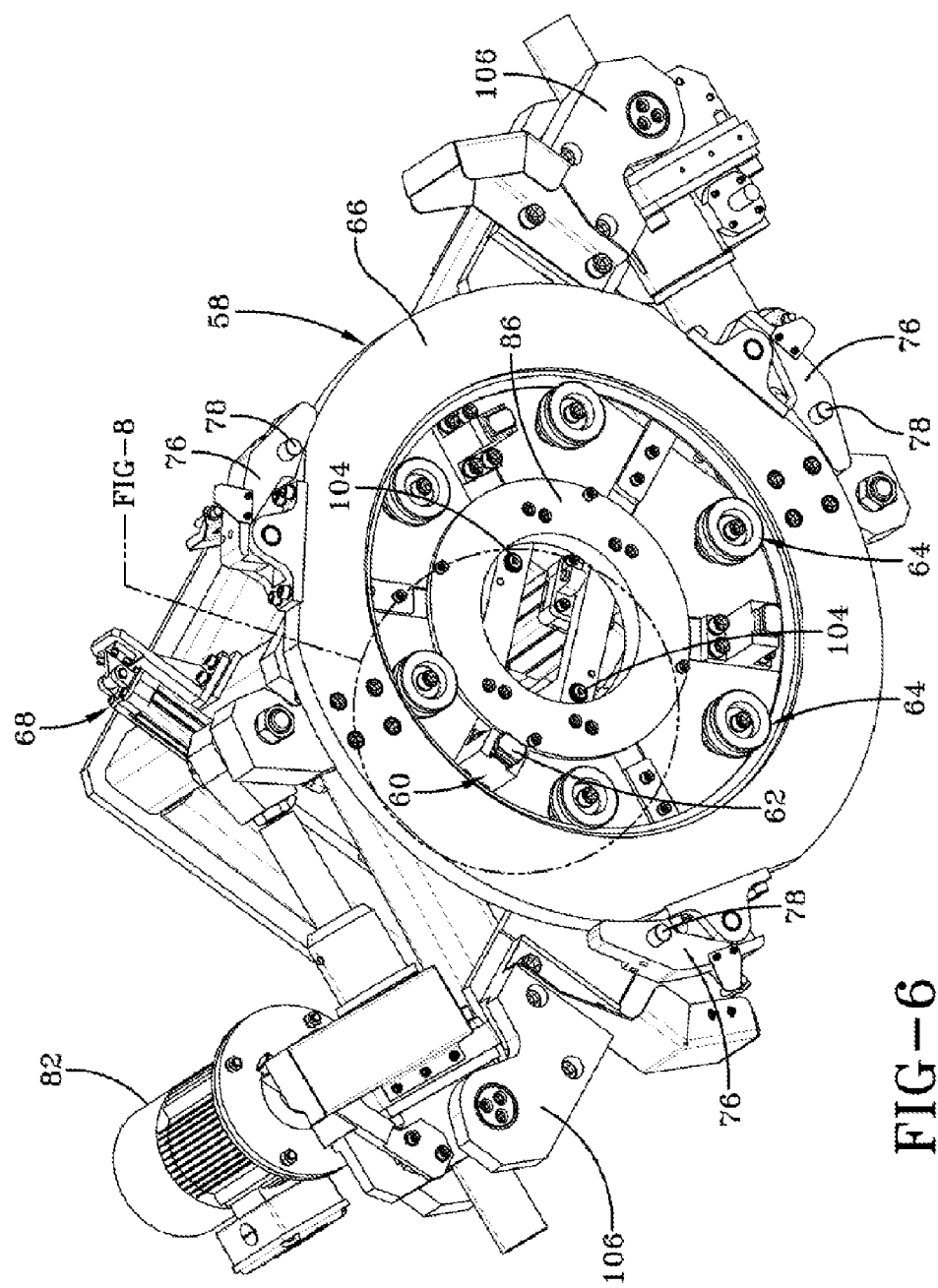
FIG. 6 is a bottom perspective view of an upper sub-assembly of the mold gripper assembly.

FIGS. 6 and 7 show the mold gripper assembly 58. The bottom view shown in FIG. 6 shows the (3) circumferentially spaced mold guides 60 having locking shafts 62 that engage the circumferentially spaced notches 116 within the upper sidewall plate 118 of the self locking mold 44. The notches 116, or pockets, are shown in FIG. 10. The pockets 116 are cut radially outward from the mold center 120 degrees apart, narrow enough for a close fit on the sides with the mold guides 60, but long enough that the ends have clearance with the mold guides 60. This allows accurate location of the mold 44 in the gripper assembly 58 while still allowing the mold to expand and contract with changing temperature. The mold guides also provide torsional resistance to the turning forces placed on the mold when the upper breech ring is latched or unlatched.

Figure 8:
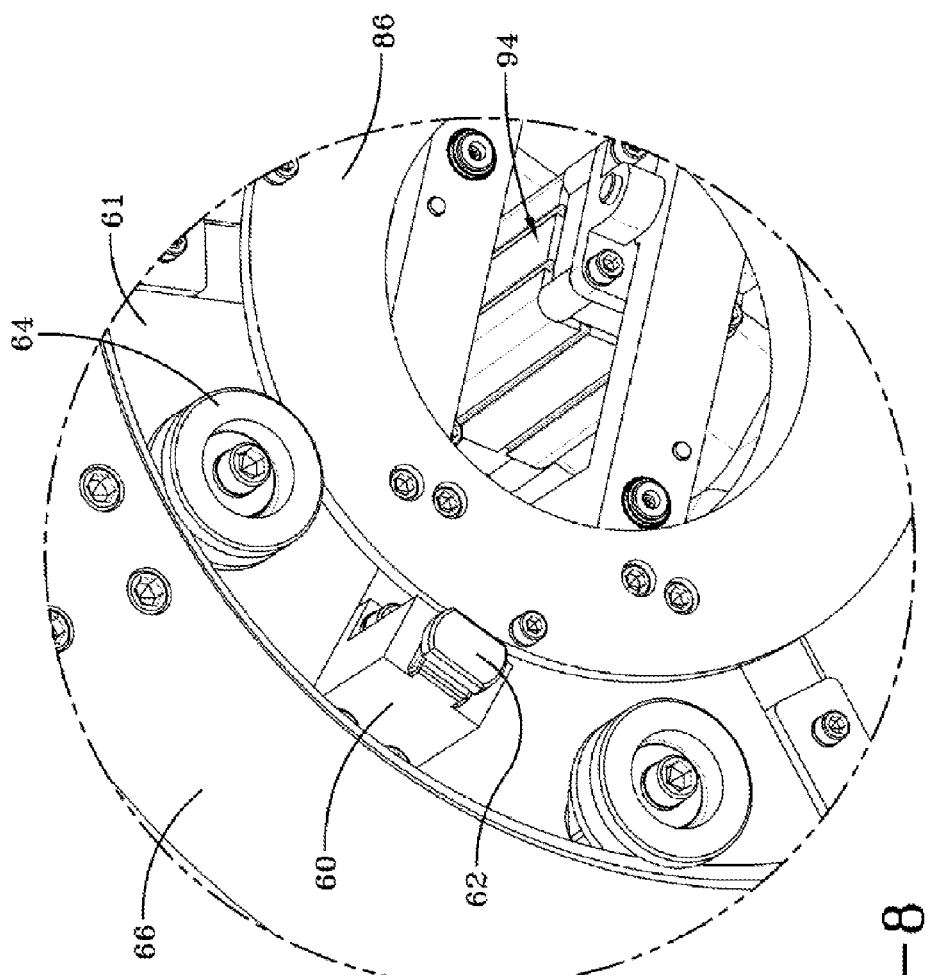
FIG. 8 is an enlarged bottom perspective view of a hold down sub-assembly shown in the mold locked position.
Figure 9:
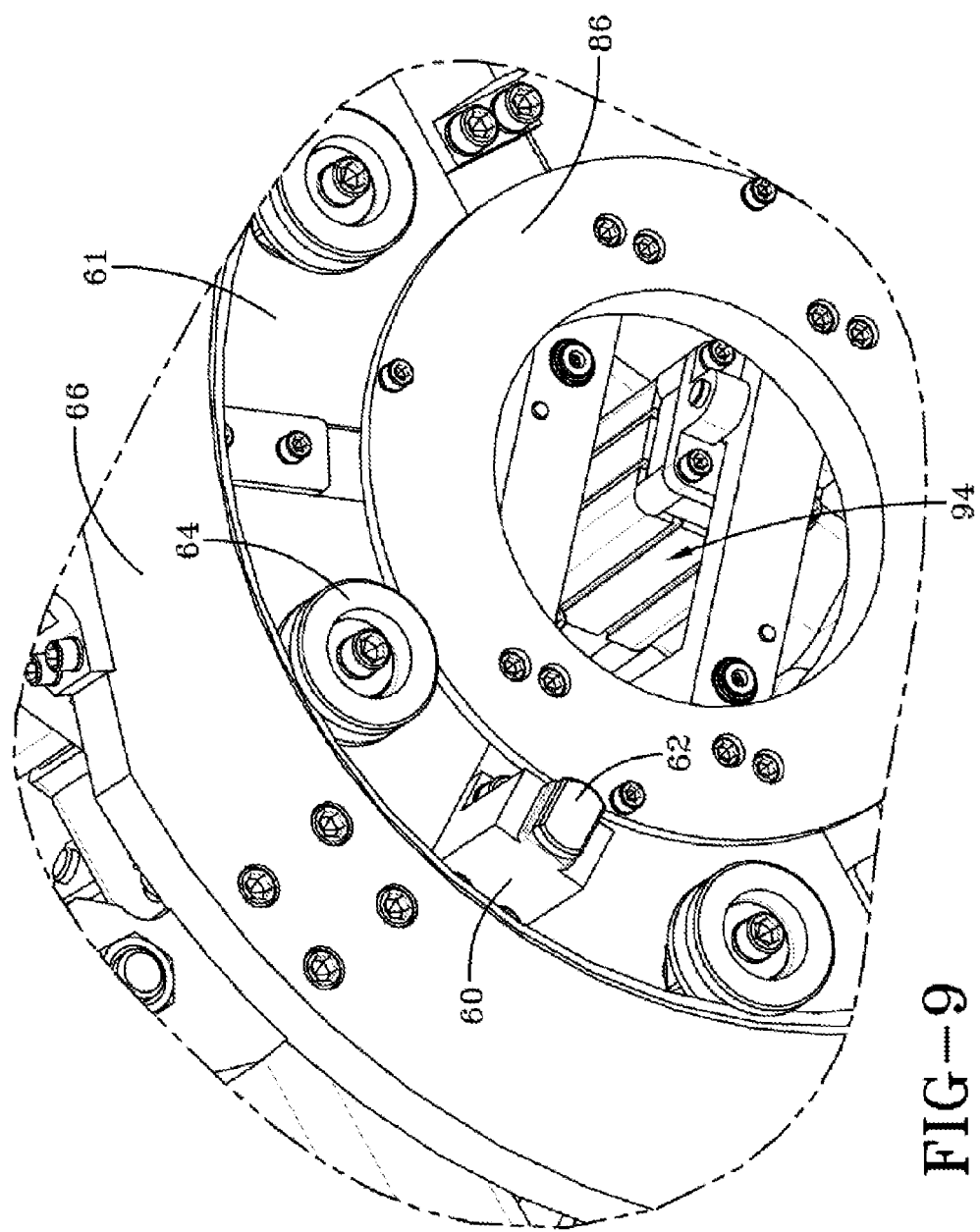
FIG. 9 is a bottom perspective view of a hold down sub-assembly shown in the mold release position.

The latching of the mold to the mold gripper assembly 58 is accomplished with a rotating lock shaft 62 at the end of each of the mold guides 60. When placed in the mold and turned these engage undercuts 120 in the bottom of the mold pockets 116, allowing the mold to be lifted. FIGS. 8 and 9 show close-ups of the end of the lock shaft 62 in the latched and unlatched positions, respectively. FIG. 7, a view of the top of the mold gripper assembly 58, shows the mechanism used to rotate the lock shafts. A single pneumatic cylinder 68 rotates an arm 70 clamped and keyed to one of the lock shafts 62. The other two lock shafts 62 are rotated by linkages connecting them to the first.

The mechanism that provides the second function of rotating the upper sidewall breech ring 122 to lock or unlock the self-locking mold 44 is shown in FIG. 7. It consists of a rotating circular ring 66 that has three pivoting arms 76 mounted to it. Each of those arms 76 has a pin 78 that engages a notch 124 in the mold breech ring 122. The ring 66 is supported and guided by six (6) V rollers 64 (visible in FIG. 6) and is powered by two ball screw jacks 82. The use of three equally spaced pins 78 and two equally spaced jacks 82 allows the application of the large torque required to operate the self-locking mold 44 without the introduction of large side forces on the mechanism.

Figure 11:
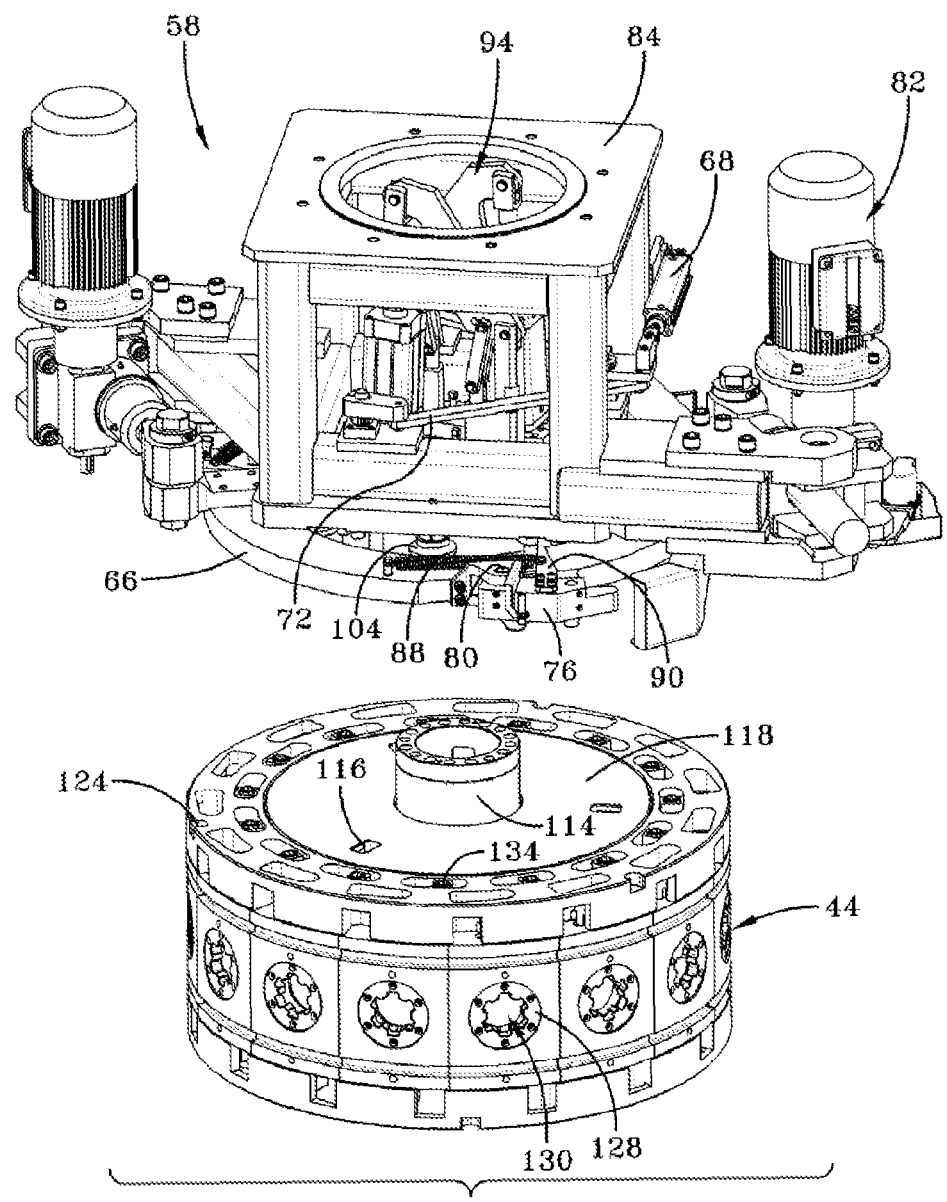
FIG. 11 is a perspective view of a segmented mold positioned below an upper sub-assembly of the mold gripper assembly.

FIGS. 11 through 15 show the sequence that the mold gripper assembly 58 performs in order to engage the mold and operate the breech ring. In FIG. 11 the gripper is positioned over the mold in the mold assembly/disassembly station 18, the mold storage/load stand 20, or the cure station 22. The lock shafts 62 are in the unlatched position and the ball screw jacks 82 are fully retracted, forcing the actuation arm 90 mounted to the breech pin engagement arms 76 against cam rollers 92. This opens the arms 76 outward, positioning the pins 78 outside the diameter of the breech ring 122.

FIG. 12 shows the next step, wherein the mold gripper assembly 58 is lowered until the guide pins 62 are fully engaged in the pockets 116 of the mold 44. The pneumatic cylinder 68 is then extended, rotating the lock shafts 62 and latching the mold 44 to the mold gripper assembly. The mold 44 can then be lifted to transport to another station. FIG. 12A shows the same step looking from a different angle. From this view it is clear that the breech engagement pins 78 are outside the breech ring 122 and do not touch it.

Figure 13:
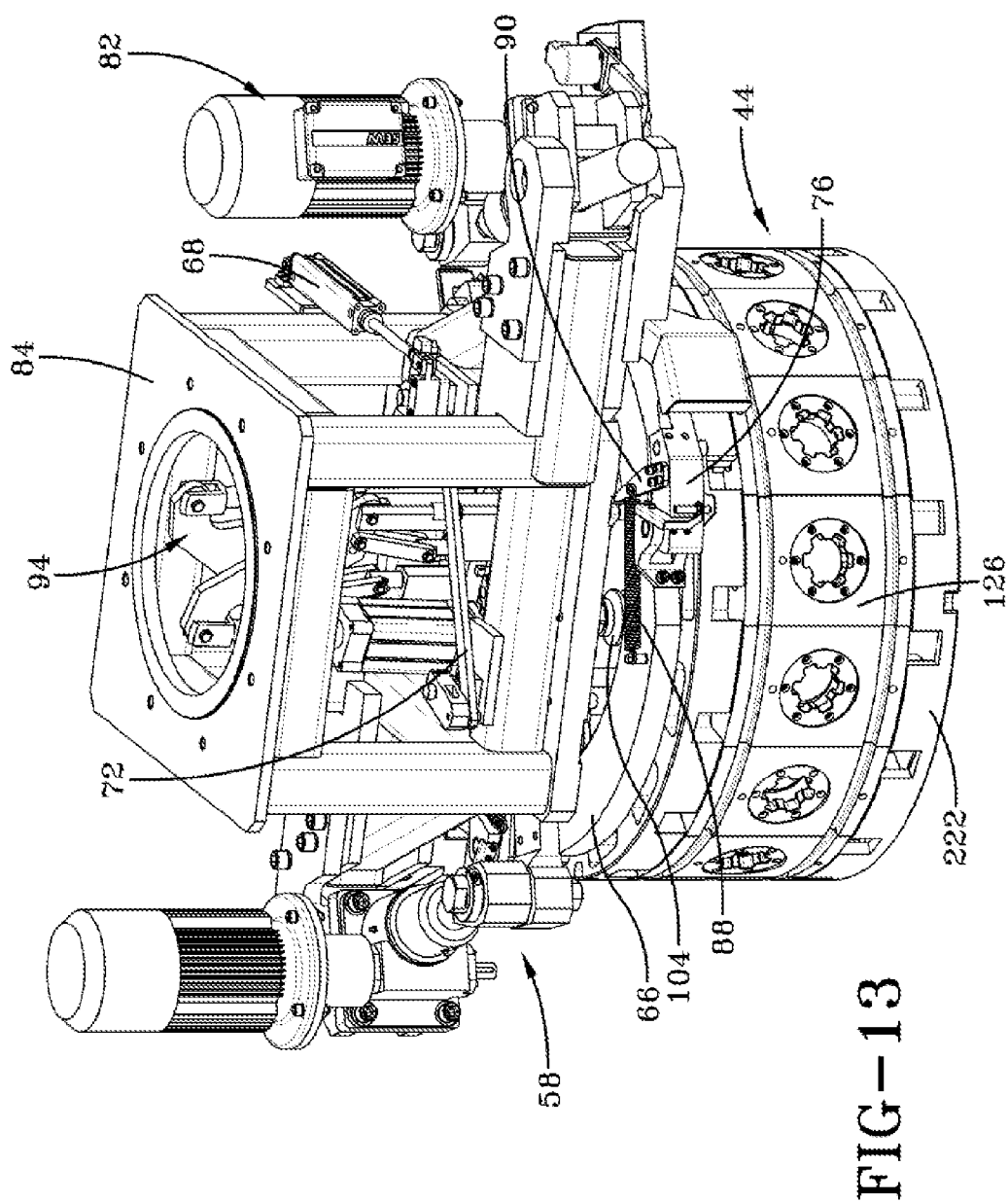
FIG. 13 is a view sequential to FIG. 12 showing rotation of the upper gripper ring from extension of an actuating ball screw.
Figure 13A:
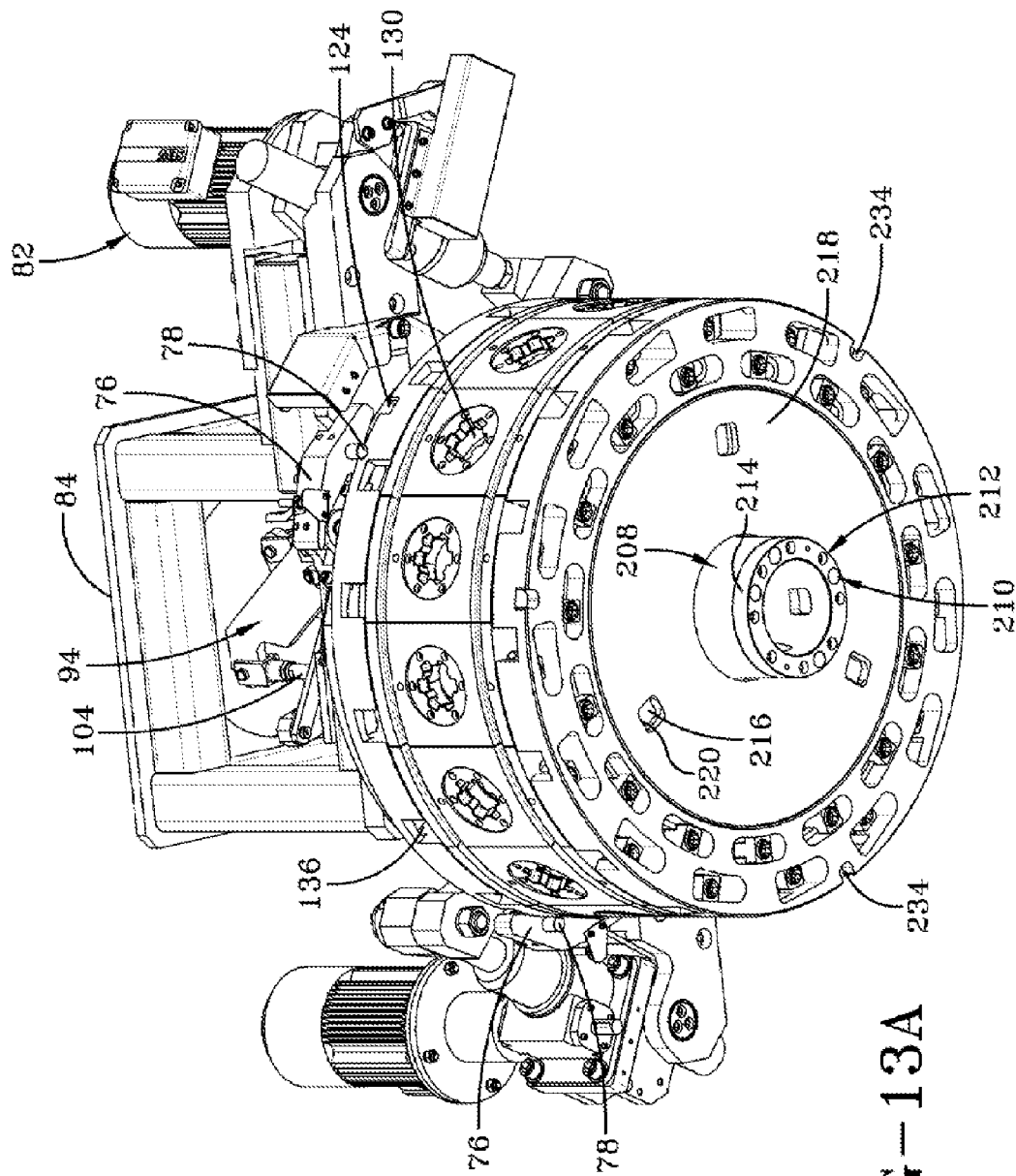
FIG. 13A is a bottom view showing rotation of the upper gripper ring from extension of an actuating ball screw.

FIGS. 13 and 13A show the next step in the mold opening sequence. Here the ball screw jacks 82 have been partially extended, allowing the actuation arm 90 mounted to the breech pin engagement arms 76 to come out of contact with the cam rollers 92. When this happens the springs 88 will pull the arms 76 inward until the pins 78 contact the breech ring 122.

The extension of the ball screw jacks 82 continues until the ring 122 rotates far enough for the pins 78 to fall into the notches 124 cut in the outside diameter of the mold breech ring 122. This is shown in FIGS. 14 and 14A. A proximity switch on each of the arms 76 detects that the arm is now fully inward and the pin 78 engaged with the breech ring 122.

Figure 15:
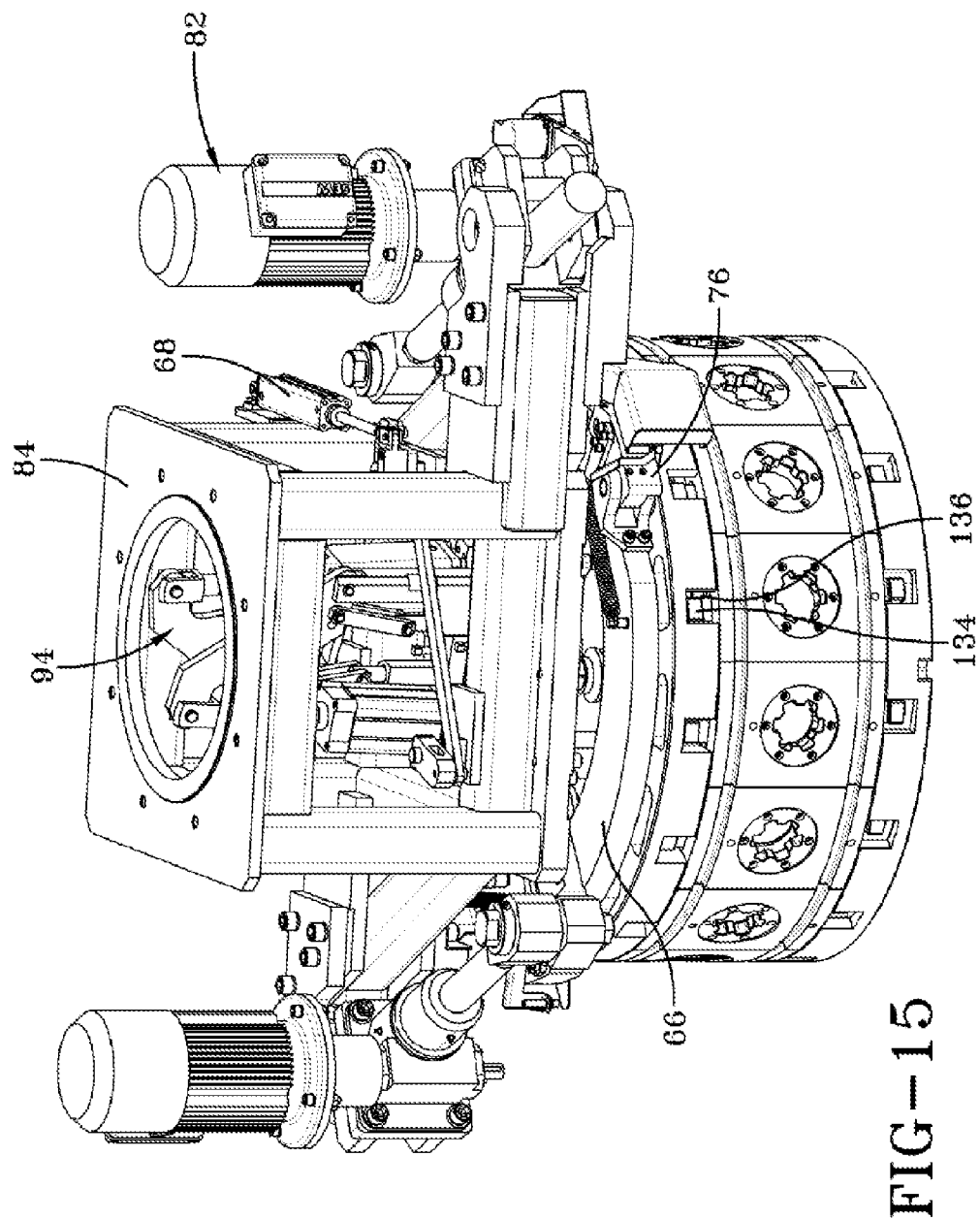
FIG. 15 is a view sequential to FIG. 14 showing further rotation of the upper gripper ring.
Figure 15A:
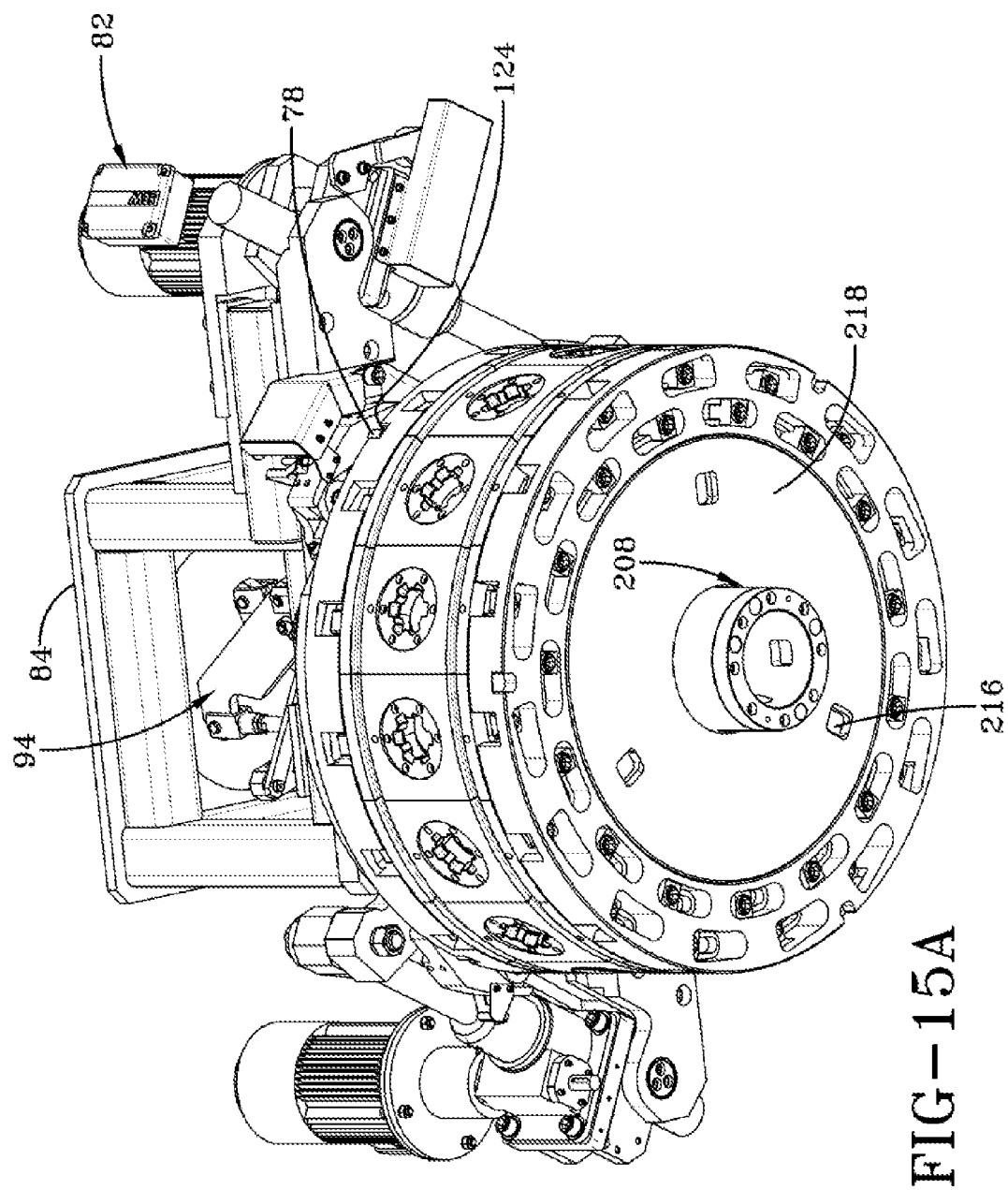
FIG. 15A is a bottom perspective view thereof.

When it is desired to open the mold, the ball screw jacks 82 are fully extended and the breech ring 122 is rotated enough to unlock the mold. This is shown in FIGS. 15 and 15A. It will be noted that the mold gripper assembly 58 shown only unlocks and locks the upper breech ring 122. An identical mechanism in the mold assembly station 18 operates the lower breech ring 222 simultaneously. Locking the mold 44 is accomplished by retracting the ball screw jacks 82 and rotating the breech lock ring 122 back to its original position.

When the mold 44 is to be left in a station the mold is simply lowered until it is supported by the station's locating pins (mold assembly/disassembly station 18 or mold loading and storage station 20 or table surface in the cure station 22). The lock shafts 62 are rotated to the unlatched position as described above and the mold gripper assembly 58 is raised to clear the mold. If engaged, the breech engagement pins 78 will slide from the breech ring notches 124. After the mold gripper assembly 58 is fully clear of the mold 44, the pins 78 can be returned to their open position by retracting the ball screw jacks 82 and the mold gripper assembly 58 is ready for the next cycle.

The mold assembly/disassembly apparatus 29 in the mold assembly/disassembly station 18 is comprised of three sub-assemblies: the mold loading stand 138; the tread segment closer sub-assembly 144; and the mold plug-in apparatus 40. FIG. 3 shows the mold assembly/disassembly station 18 with the three subassemblies 138, 144, 40 together.

FIG. 16 shows the mold loading stand 138 empty and FIG. 17 shows the stand 138 loaded with a mold 44. It supports the self-locking mold 44 while the mold is opened and the core is loaded/unloaded. It has three locating pins 234 that engage pockets 216 in the bottom sidewall plate 218 of the mold 44 for support and location, similar to the pockets 116 on the top plate 118 engaged by the mold gripper assembly 58. Unlike the pockets 116, however, the pockets 216 do not include undercuts or lock shafts analogous to undercuts 120 and lock shafts 62. The weight of the mold 44 holds it in place on the mold loading stand pins 234.

Also, like the mold gripper assembly 58, the mold loading stand 138 has breech pin engagement arms 230 and pin 232 mechanisms and ball screw jacks 226 to lock and unlock the lower breech ring 222 of the mold 44. The arrangement is structurally and functionally identical to that on the mold gripper assembly 58.

Figure 18:
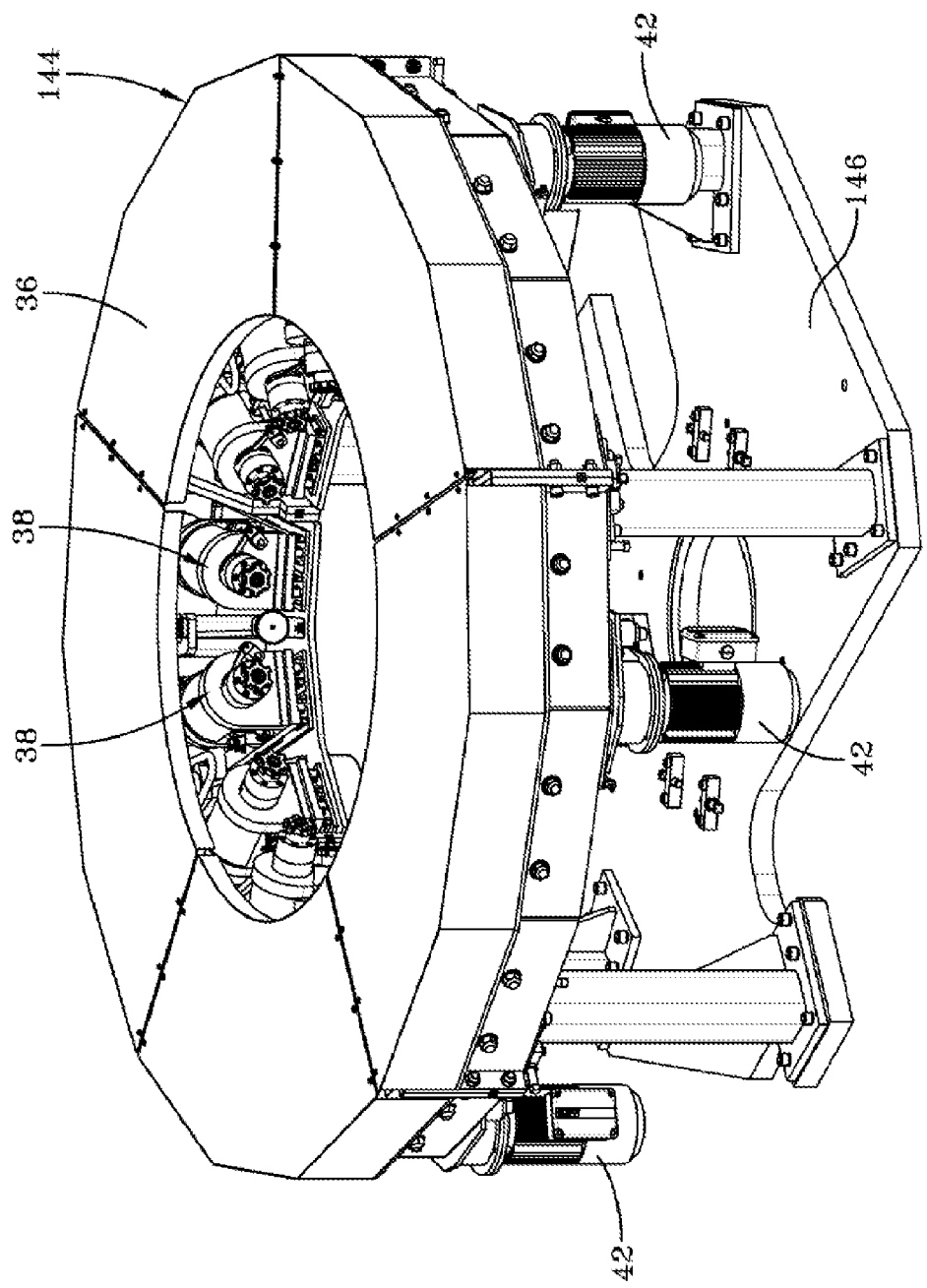
FIG. 18 is a perspective view of the tread segment manipulating sub-assembly of the gripper assembly.

The tread segment closer sub-assembly 144 is shown by itself in FIG. 18. Its function is to radially open and close the fifteen (15) tread segments 126 of the self-locking mold 44. To accomplish this, the sub-assembly 144 has fifteen (15) actuators or manipulators 38 arranged in an equally spaced pattern around the circumference of the mold 44. Each actuator 38 has a latching mechanism 150 allowing it to attach to an individual tread segment 126 so that it can be pulled radially outward to open the mold 44. FIG. 19 shows the actuator carriage 148 as well as the latching mechanism 150. The latch 150 works in conjunction with a hardened steel insert 128 bolted into holes in the tread segments 126. (These are shown in FIG. 10.) Each insert 128 has a center star-shaped socket 130 including a number of radial slots extending outward from the socket. Each socket 130 matches the configuration of a star latch 152 on the end of the actuator 38, so that it can be inserted into the socket 130 in the segment insert 128 and latched by rotating it within the radial slots extending from the socket 130.

For proper operation of the self-locking mold 44 the tread segments must be moved in a synchronized manner. The motion of the actuators 38 is synchronized in two ways. First, the (15) actuators 38 are divided into five groups of three. Because a large force is required to form the tire tread during closing, each actuator 38 is driven by a ball screw jack 164. All three of the jacks in a group are driven by a single motor 42 through a common timing belt 174, which synchronizes them mechanically. FIG. 20 shows a group of three actuators 38 with guards 36 removed to make the drive train visible. The five motors 42 driving the groups are then synchronized electronically, based on the output of encoders connected to the drive trains with timing belts. FIG. 21 is a partial view of the underside of the tread segment closer sub-assembly 144 showing the motors and encoders. Drive shaft 168 is coupled to motor 42 by the belt 182. An encoder pulley 170 is coupled to the shaft 168 by belt 171. A belt tensioner assembly 180 is placed in engagement with belt 182 to control the tension of belt 182.

The mold plug in unit 40 is shown in the mold loading stand 138 in FIG. 22 and by itself in FIG. 23. The mold plug in unit 40 has a frustro-conical shaped nose 184 that engages a mating female socket 209 in the lower end of lower core spindle 208. The nose 184 engages the lower core spindle 208 as the tire building core assembly 15 is loaded into the self-locking mold 44. This frustro-conical interface between nose 184 and the socket 209, along with a key 211 in the socket 209 and keyway 185, aligns electrical connectors 186, 19 in both parts. Pneumatic cylinders 200 in the mold plug in unit 40 then insert the connectors together, providing a means to supply electrical power to the heaters in the tire building core. Consequently, a heating of the tire building core may be initiated while the core assembly 15 is in the mold assembly/disassembly station 18 as will be appreciated from FIG. 22.

In addition, there are two pneumatic cylinders 188 that extend and retract and, when extended, hold up the ring 190 which supports the upper part of the mold plug-in unit 40. This is done during the initial loading of the tire building core assembly 15 into the mold 44. It allows the core to be loaded and the electrical connectors 186, 191 to be plugged in, but does not allow the core to be lowered completely. By holding the core up approximately ½ inch high, the mold plug-in unit 40 prevents the lower sidewall plate 218 of the mold 44 from coming into contact with the tire lower sidewall rubber on the core. Stated differently, the core is elevated by the mold plug-in unit 40 a distance above the lower sidewall plate 218 as the mold is assembled around the core assembly 15. An initial air gap is thus created and maintained between the lower sidewall plate 218 and the lower sidewall portion of the tire constructed on the core while the core is assembled. This prevents the premature curing of the tire lower sidewall before the mold is closed. When the upper sidewall plate 118 has been moved back into position over the mold 44 and lowered down, the pneumatic cylinders 188 in the mold plug-in unit will also be lowered, allowing the core to come down to its final position and the mold 44 to be closed.

FIG. 24 shows a section cut vertically through the mold plug-in unit 40. The upper assembly (electrical connector housing 186, 191, actuator cylinders 188 and engagement nose 184) rest on a set of springs 192 and are loosely constrained radially and angularly on the center post 206. When the core is lowered onto the nose 184 the upper assembly is free to rotate and move radially slightly to align itself to the core socket 209.

There is a similar mold plug-in unit (identical, less the support cylinder 188 parts) at the cure station 22 to provide power to the core heaters during the cure cycle. Thus, when a nose 184 and the mating core socket 209 are connected at both the mold assembly/disassembly station 18 and the cure station 22, electrical connectors mate allowing electrical power to the core heaters during the mold assembly and cure cycles respectively. Heating the core internally within the mold 44 at the cure station 22 while simultaneously heating the mold 44 from external induction heating allows for better control over the curing process and an improved quality finished tire.

The sequence of operation of the curing line and the apparatus therein will be described.

Initial Conditions:
1. The cure cycle is complete for a mold/core/tire assembly 15 at the cure station 22.
2. The upper induction heating assembly 24 at the cure station 22 has been lifted and rotated out of the way by jib crane 236 to expose the mold/core/tire assembly 15.
3. The mold assembly station 18 and the mold manipulation assembly 26 are empty and open.

The sequence of operation is described below, it being understood that the numerical assignment to each step in the sequence is arbitrary and for illustration only.

1. The mold manipulation assembly 26 moves to the cure station 22 and lowers the mold gripper assembly 58 by means of frame 48 until it engages and latches to the self-locking mold 44.
2. The mold manipulation assembly 26 lifts the mold/core/tire assembly and moves it to the mold assembly station 18.
3. The mold manipulation assembly 26 lowers the mold/core/tire assembly until the pockets 216 in the bottom of the Self Locking Mold engage the locating pins 234 in the top 223 of the mold loading stand 138.
4. The following (3) things occur simultaneously: A) The tread segment closer sub-assembly 144 moves the actuator carriages 148 inward radially until the star latches 152 are inserted into the mold insert sockets 130. The star latches 152 are then rotated to latch them to the mold 44. B) The ball screw jacks 82 on the mold gripper assembly 58 are extended, moving the upper breech ring engagement pins 78 around the circumference until they snap into the pockets 124 on the breech ring 122. C) The ball screw jacks 226 on the mold loading stand 138 are extended, moving the lower breech ring engagement pins 232 around the circumference until they snap into the pockets 124 on the lower breech ring 222.
5. The following (2) things occur simultaneously: A) The ball screw jacks 82 on the mold gripper assembly 58 are extended more, unlocking the upper breech ring 122. B) The ball screw jacks 226 on the mold loading stand 138 are extended more, unlocking the lower breech ring 222.
6. The tread segment closer sub-assembly 144 moves the actuator carriages 148 outward radially, pulling the tread segments 126 out and opening the mold.
7. The mold manipulation assembly 26 lifts the upper sidewall/breech ring assembly from the rest of the mold 44 and then moves it to the mold loading and storage station 20 for clearance. As this is done, the holddown devices 94 push down against the upper core spindle end to prevent the core from lifting if it adheres to the upper sidewall plate of the mold.
8. An upper core manipulator assembly moves into place and lifts the tire/core assembly from the mold, then transfers it to a tire building core assembly and disassembly station.
9. The support cylinders 188 on the mold plug-in unit 40 are extended.
10. The upper core manipulator assembly brings a new uncured tire/core assembly from a tire upender station, positions it over the mold assembly station 18 and lowers it until it is engaged in and supported by the mold plug-in unit 40. The upper core manipulator then releases the core, retracts up and moves out of the way.
11. The mold manipulation assembly 26 moves the upper sidewall/breech ring assembly back over the mold assembly station 18.
12. The mold manipulation assembly 26 lowers the upper sidewall/breech ring assembly onto the rest of the mold 44 and the core. As it reaches the core the support cylinders 188 on the mold plug-in unit 40 are retracted, allowing the core to be lowered into its final position. The mold manipulation assembly 26 stops its downward motion when the upper sidewall/breech ring assembly is near its closed position. The motion partially forms the sidewall areas of the tire.
13. The plug-in cylinders 200 on the mold plug-in unit 40 are extended, bringing the electrical connectors 186 in the mold plug-in unit collar 190 and the lower core spindle 208 together and allowing power to be applied to the core heaters as needed.
14. The tread segment closer sub-assembly 144 moves the actuator carriages 148 inward radially, pushing the mold tread segments 126 near their closed position and partially forming the tire tread.
15. The following (2) things occur simultaneously: A) The ball screw jacks 82 on the mold gripper assembly 58 are retracted to a particular position, locking the upper breech ring 122. B) The ball screw jacks 226 on the mold loading stand 138 are retracted to a particular position, locking the lower breech ring 222. These motions also completely close the mold 44 and finish forming the tire.
16. The tread segment closer sub-assembly 144 moves the actuator carriages 148 outward radially a short distance until the force on the star latches 152 is relieved. The star latches 152 are then rotated to unlatch them from the mold 44.
17. The tread segment closer sub-assembly 144 moves the actuator carriages 148 outward radially until the star latches 152 are clear from the mold.
18. The plug-in cylinders 200 on the mold plug-in unit 40 are retracted, unplugging the electrical connectors from the core.
19. The mold manipulation assembly 26 lifts the mold/core/tire assembly and moves it to the cure station 22.
20. The ball screw jacks 226 on the mold loading stand 138 are retracted, opening the lower breech ring engagement pins 232.
21. The mold manipulation assembly 26 lowers the mold/core/tire assembly onto the cure station 22.
22. The mold gripper assembly 58 unlatches from the mold.
23. The mold manipulation assembly 26 lifts the mold gripper assembly 58 and moves to the mold loading and storage station 20 for clearance.
24. The ball screw jacks 82 on the mold gripper assembly 58 are retracted, opening the upper breech ring engagement pins 78.
25. The cure station 22 cycle starts.

The cure line 10 may be used for a single mold and a single core application wherein only one mold and core are utilized at a time. However, alternatively, there is a possible alternate sequence that would allow the system to handle (2) molds and (3) cores simultaneously. With the extra mold the cure station 22 would provide heat for a period of time to bring the mold/core/tire assembly up to curing temperature. Once this was achieved the mold manipulation assembly 26 would move the mold/core/tire assembly to the mold loading and storage station 20 and place it on a stand, where the tire would continue to cure without additional power. The mold manipulation assembly 26 would then transfer the other mold/core/tire assembly from the mold assembly station 18 to the cure station 22. When the first mold/core/tire assembly is finished curing the mold manipulation assembly 26 would transfer it to the mold assembly station 18 for disassembly per the sequence above.

It will be appreciated that the subject curing line 10 is useful in the manufacture of all types of tires as well as non-tire items such as bladders and sleeves. Use of the line is not limited by material constraints and may be used for rubber as well as non-rubber curing applications.

From the foregoing it will be further appreciated that mold loading stand assembly 138 provides means for positioning a green tire and core assembly into the toroidally shaped mold 44. The pins 234 on frame weldment 142 of stand assembly 138 provide a support surface for operatively receiving and supporting the lower mold sidewall forming segment 218 thereon. The apparatus 40 represents a spindle engagement assembly that projects upwardly through the support ring 223 central opening and operatively couples the nose 184 to the lower spindle end 208 of the tire building core 15. The apparatus in the up, extended position, suspends a sidewall of a green tire on the tire building core 15 a distance above the lower mold sidewall forming segment 218 positioned on the pins 234 of frame weldment 142. The gap eliminates contact between the sidewall forming segment 218 and the green tire sidewall until the entire mold 44 is assembled about the tire building core 15. Premature cooling of the green tire sidewall opposite segment 218 is thereby prevented. The spindle engaging apparatus moves axially between a raised position and a lowered position. In the lowered position, apparatus 40 places the sidewall surface of the green tire onto the first mold sidewall forming segment 218 on the pins 234 of frame weldment 142.

The operation of the stand assembly 138 therefore includes:
 a. locating the mold sidewall forming segment 218 on the pins 234 of frame weldment 142;
 b. projecting the spindle engaging assembly 40 through the ring central opening and into a coupled relationship with the end of spindle 208 of tire building core assembly 15;
 c. suspending a sidewall of the green tire on the tire building core assembly 15 a distance above the mold sidewall forming segment 218;
 d. assembling the mold segments 118, 218, 126, 122, 222 to enclose the green tire; including
 e. lowering the sidewall of the green tire by lowering the assembly 40 until the green tire sidewall is engaged by the mold sidewall forming segment 218 located on the pins 234 of frame weldment 142.

It will further be noted that the subject curing line 10 is for molding a green tire into a finished tire having a tread and sidewall pattern. The curing line 10 includes a toroidally shaped core assembly 15 formed by a plurality of core segments each having an outer surface portion which together define a toroidal outer surface surrounding a central axis. The core is adapted to hold a green tire on said toroidal outer surface. U.S. patent application Ser. No. 11/292,991 entitled "TIRE BUILDING CORE LATCHING AND TRANSPORT MECHANISM", filed Dec. 2, 2005 and U.S. patent application Ser. No. 11/293,397 entitled "HEATED TIRE BUILDING CORE ASSEMBLY AND METHOD", filed Dec. 2, 2005, incorporated herein by reference teaches such a core assembly 15. A first spindle section 108 is configured to be placed on a first side of the core along the central axis and a second spindle section 208 is configured to be placed on a second side of the core along the central axis and opposite to the first side. At least one electrically operated heating element is coupled with each core segment and at least one spindle connector is configured to mechanically couple the first and second spindle sections with the plurality of core segments located therebetween and electrically connect with the electrically operated heating elements for supplying electrical power thereto during a tire curing operation.

A curing line docking station referred to herein as the core electrical plug-in unit 40 has docking apparatus (nose 184) for mechanically coupling with a spindle end 208 of the core assembly 15 for a docking time interval. The docking unit 40 includes multiple docking connectors 186 configured to mechanically and electrically couple with spindle connectors for supplying electrical power to the electrically operated heating elements of the core segments. The core is lowered so that the spindle end 208 contacts the nose 184. This cone-to-cone contact along with the engagement of a key in the spindle end 208 to the keyway 185 in the nose 184 aligns the connectors 186 with the other connector halves 212. Then the connectors are engaged by extending cylinders 188. Once the connectors 186 establish mechanical and electrical connection to the connectors in the spindle end 208, electrical power may be supplied to the core segments forming the core toroidal surface bearing the green tire. Heating the core segments while the mold is assembled about the core assembly 15 keeps the core at an optimum temperature. In the absence of heating the core assembly at the mold assembly and disassembly station 18, a cooling of the core assembly would otherwise occur that could prolong the subsequent cure cycle or result in an uneven tire cure. Heat may thereby be generated within the core segments by the flow of electrical power from the plug-in docking unit 40 to the core via spindle connection 208. The heating of the core assembly 15 at the curing line station 18 may be for the entire docking time interval or only part of the docking interval as necessary to maintain the core assembly at its desired temperature.

It will be further appreciated that one or more docking stations, such as station 18 and cure station 22 may be provided with a coupling interface with spindle 208. Both stations may thereby sequentially receive and couple with a core assembly having a green tire mounted to a toroidal core surface. Each docking station 18, 22 has docking apparatus for mechanically coupling with a spindle end 208. It will be noted that the docking apparatus for the stations 18, 22 is similarly constructed to include a frustro-conical nose 184 configured to mechanically and electrically couple with the connectors in spindle end 208 as described above. Thus, the core assembly 15 at both stations may be supplied with electrical power to the electrically operated heating elements for all or part of the docking intervals at each station. Maintaining core temperature to an optimal level at the cure station 22 will allow for a more controlled curing process and shorten the time required to cure a green tire.

The method for utilizing the tire curing line coupling and docking apparatus above described will be understood to include: assembling a plurality of core segments into a toroidal-shaped assembled core surrounding a central axis. Each core segment includes at least one electrically operated heating element, and the core segments together define a toroidal outer surface. The core is adapted to hold a green tire on said toroidal outer surface. The method includes placing a first spindle section 108 on a first side of the plurality of the assembled core along the central axis; placing a second spindle section 208 on a second side of the assembled core along the central axis and opposite to the first side; mechanically coupling the first and second spindle sections with the plurality of core segments so as to locate the plurality of core segments between the first and second spindle sections; connecting an electrical connector carried by at least one of the first or second spindle sections with the electrically operated heating elements for supplying electrical power thereto during a tire curing operation. The method further includes mechanically coupling a spindle end 208 to docking apparatus 40 in one or more curing line docking stations (such as stations 18, 22) for respective docking time interval(s). The docking apparatus 40 includes at least one docking connector 186 configured to mechanically and electrically couple with the spindle connector for supplying electrical power.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A curing line for molding a green tire into a finished tire having a tread pattern, comprising:
    a toroidally shaped core formed by a plurality of core segments each having an outer surface portion which together define a toroidal outer surface surrounding a central axis, said core adapted to hold a green tire on said toroidal outer surface;
    a first spindle section configured to be placed on a first side of said plurality of core segments along the central axis;
    a second spindle section configured to be placed on a second side of said plurality of core segments along the central axis and opposite to said first side;
    at least one electrically operated heating element coupled with each said core segment;
    at least one spindle connector configured to mechanically couple the first and second spindle sections with said plurality of core segments located therebetween and electrically connect with the electrically operated heating elements for supplying electrical power thereto during a tire curing operation;
    at least one curing line docking station having docking apparatus mechanically coupling with a spindle end of at least one of said first and second spindle sections for a docking time interval, the docking apparatus including at least one docking connector configured to mechanically and electrically couple with the at least one spindle connector for supplying electrical power to the electrically operated heating elements.

2. The apparatus of claim 1, wherein the docking apparatus and the spindle end comprising an operatively mating protrusion and socket.

3. The apparatus of claim 2, wherein the spindle end includes an axial socket formed to extend therein and configured to receive a complementary configured mating docking apparatus protrusion.

4. The apparatus of claim 3, wherein the spindle end socket and the docking apparatus protrusion have a complementary frustro-conical configuration.

5. The apparatus of claim 1, wherein the docking station comprises a mold assembly and disassembly station wherein a mold formed by a plurality of mold segments are assembled during a mold assembly time interval to enclose the core segments and green tire, each of the mold segments having an inner surface portion which together define a tread and sidewall pattern to be formed on the green tire.

6. The apparatus of claim 1, wherein the docking station comprises a tire curing station wherein heat is introduced into a toroidally shaped mold enclosing the core segments and green tire during a mold curing time interval, the mold formed by a plurality of mold segments each having an inner surface portion together define a tread and sidewall pattern to be formed on the green tire.

7. The apparatus of claim 1, further comprising at least a first and a second docking station, each docking station having docking apparatus for mechanically coupling with a spindle end of at least one of said first and second spindle sections for a first and second docking time interval, respectively, the docking apparatus including at least one docking connector configured to mechanically and electrically couple with the at least one spindle connector for supplying electrical power to the electrically operated heating elements for at least a part of the first and the second docking intervals.

8. The apparatus of claim 7, wherein the first and second docking stations comprise a mold assembly and disassembly station and a mold curing station, respectively.

9. A method of molding a green tire into a finished tire having a tread pattern, comprising:
    assembling a plurality of core segments into a toroidal-shaped assembled core surrounding a central axis, each core segment including at least one electrically operated heating element, and the core segments together defining a toroidal outer surface, said core adapted to hold a green tire on said toroidal outer surface;
    placing a first spindle section on a first side of the assembled core along the central axis;
    placing a second spindle section on a second side of the assembled core along the central axis and opposite to the first side;
    mechanically coupling the first and second spindle sections with the plurality of core segments so as to locate the plurality of core segments between the first and second spindle sections;
    connecting an electrical spindle connector carried by at least one of the first or second spindle sections with the electrically operated heating elements for supplying electrical power thereto during a tire curing operation;
    mechanically coupling a spindle end of at least one of said first and second spindle sections to docking apparatus in a first curing line docking station for a first docking time interval, the docking apparatus including at least one docking connector configured to mechanically and electrically couple with the at least one spindle connector for supplying electrical power to the electrically operated heating elements for at least a portion of the docking time interval.

10. The method of claim 9, further comprising relocating the core and a green tire on said toroidal outer surface; and mechanically coupling the spindle end of the at least one of said first and second spindle sections to a second docking apparatus in a second curing line docking station for a second docking time interval, the second docking apparatus including at least one second docking connector configured to mechanically and electrically couple with the at least one spindle connector for supplying electrical power to the electrically operated heating elements for at least a portion of the second docking time interval.

* * * * *